US008359206B2

(12) United States Patent
Whalin et al.

(10) Patent No.: US 8,359,206 B2
(45) Date of Patent: Jan. 22, 2013

(54) WEB BASED INTERACTIVE MEETING FACILITY

(75) Inventors: Gregory P. Whalin, Brooklyn, NY (US); Scott Heiferman, New York, NY (US); Matt Meeker, Brooklyn, NY (US); Peter Kamali, Scranton, PA (US)

(73) Assignee: Meetup, Inc., New York, NY (US)

( * ) Notice: Subject to any disclaimer, the term of this patent is extended or adjusted under 35 U.S.C. 154(b) by 719 days.

(21) Appl. No.: 12/482,084

(22) Filed: Jun. 10, 2009

(65) Prior Publication Data
US 2010/0017371 A1 Jan. 21, 2010

Related U.S. Application Data

(63) Continuation-in-part of application No. 10/710,055, filed on Jun. 15, 2004.

(60) Provisional application No. 61/060,321, filed on Jun. 10, 2008.

(51) Int. Cl.
*G06Q 10/00* (2012.01)
(52) U.S. Cl. ........................................ 705/1.1
(58) Field of Classification Search .................. None
See application file for complete search history.

(56) References Cited

U.S. PATENT DOCUMENTS

| | | | | |
|---|---|---|---|---|
| 6,519,629 | B2 * | 2/2003 | Harvey et al. | 709/204 |
| 6,819,919 | B1 | 11/2004 | Tanaka | |
| 7,082,402 | B2 | 7/2006 | Conmy et al. | |
| 7,113,797 | B2 | 9/2006 | Kelley et al. | |
| 7,236,976 | B2 | 6/2007 | Breitenbach et al. | |
| 7,532,900 | B2 * | 5/2009 | Wilson et al. | 455/456.3 |
| 2003/0046296 | A1 | 3/2003 | Doss et al. | |
| 2003/0115203 | A1 | 6/2003 | Brown et al. | |
| 2004/0098275 | A1 | 5/2004 | Hubert | |
| 2006/0095376 | A1 | 5/2006 | Mitchell et al. | |
| 2007/0282661 | A1 | 12/2007 | Franco | |
| 2008/0071874 | A1 | 3/2008 | Roodman et al. | |
| 2008/0098313 | A1 | 4/2008 | Pollack | |
| 2008/0301568 | A1 | 12/2008 | Im et al. | |
| 2009/0222522 | A1 | 9/2009 | Heaney | |
| 2010/0017371 | A1 | 1/2010 | Whalin et al. | |
| 2010/0095225 | A1 | 4/2010 | Langlois et al. | |

FOREIGN PATENT DOCUMENTS

| KR | 20020045929 A1 | 6/2002 |
|---|---|---|
| KR | 1020060114986 A | 11/2006 |

OTHER PUBLICATIONS

"Meetup Launches", Simon Willison's Weblog, http://simonwillison.net, Jun. 15, 2002.
www.glish.com, Online Weblog Archive, Jun. 15, 2002.

* cited by examiner

*Primary Examiner* — Jonathan Ouellette
(74) *Attorney, Agent, or Firm* — The Webb Law Firm

(57) ABSTRACT

A computer program product helps organize an in-person gathering of users of topic-related interest to help maintain ongoing local interest groups by providing meeting management resources through a web-based meeting facility, where the meeting management resources may enable a meeting group organizer to manage a meeting group. The meeting facility may receive meeting group criteria from a user, and may provide to the user an indication of at least one meeting group of a plurality of meeting groups based on the user's received meeting group criteria, wherein the meeting groups may have respective members. The meeting facility may receive from the user a selection of a meeting group to join, and the organizer may be enabled to accept the user as a new member to the meeting group and to manage meeting group user resources available to the user through a web-based graphical interface provided by the meeting facility.

29 Claims, 22 Drawing Sheets

Topics
❏ Automotive
❏ Books
❏ Cultures & Community
❏ Education
❏ Film/TV
❏ Financial
❏ Games
❏ Health
❏ Hobbies
❏ In The Market For...
❏ Internet & Technology
❏ Languages
❏ Music
❏ Pets
❏ Politics & Activism
❏ Religion
❏ Science
❏ Sports
❏ Work & Career Topics
- ☐ Automotive
- ☐ Books
- ☐ Cultures & Community
- ☐ Education
- ☐ Film/TV
- ☐ Financial
- ☐ Games
- ☐ Health
- ☐ Hobbies
- ☐ In The Market For...
- ☐ Internet & Technology
- ☐ Languages
- ☐ Music
- ☐ Pets
- ☐ Politics & Activism
- ☐ Religion
- ☐ Science
- ☐ Sports
- ☐ Work & Career

FIG. 1

Topics> Languages

American Sign Language
Next Gathering: Wednesday, June 16 @ 7:00PM
Amharic Language
Next Gathering: Wednesday, June 9 @ 6:00PM
Arabic Language
Next Gathering: Wednesday, June 9 @ 7:00PM
British Sign Language
Next Gathering: Monday, July 5 @ 7:00PM
Bulgarian Language
Next Gathering: Thursday, July 1 @ 8:00PM
Cantonese Language
Next Gathering: Saturday, June 12 @ 1:00PM Slovak Language
Next Gathering: Monday, July 5 @ 6:00PM
Spanish Language
Next Gathering: Tuesday, June 15 @ 7:00PM
Swahili
Next Gathering: Saturday, July 10 @ 3:00PM
Tagalog Language
Next Gathering: Thursday, June 24 @ 7:00PM
Thai Language
Next Gathering: Saturday, June 19 @ 1:00PM
Translator
Next Gathering: Thursday, July 1 @ 7:00PM
Turkish
Next Gathering: Thursday, July 1 @ 8:00PM
Urdu Language
Next Gathering: Monday, June 21 @ 7:00PM
Vietnamese Language
Next Gathering: Tuesday, July 13 @ 8:00PM
Visaya Language
Next Gathering: Tuesday, July 13 @ 6:00PM
Volapuk Language
Next Gathering: Wednesday, July 7 @ 7:00PM
Yiddish Language
Next Gathering: Monday, June 21 @ 7:00PM
Yoruba Language
Next Gathering: Thursday, June 17 @ 8:00PM

Left sidebar:
- ORGANIZER HELP AND TOOLS
- EMAIL THE GROUP
- ORGANIZER'S CHECKLIST
- WELCOME
- ABOUT US
- CALANDAR
- MEMBERS
- PHOTOS
- MESSAGES
- POLES
- FILES
- PROMOTE
- ORGANIZER PHOTO AND NAME Main content:

CONGRATULATIONS! YOU'RE NOW AN ORGANIZER!

EDIT YOUR MEETING

CUSTOMIZE THE INFORMATION

TITLE: 'DESCRIPTIVE TITLE'
DATE: 'DATE/TIME'

LOCATION:
- ☐ A LOCATION USED BEFORE
- ☐ A NEW LOCATION
- ☐ I'LL PICK A LOCATION LATER
- ☐ SHOW LOCATION TO MEETING GROUP USERS ONLY

HOW WILL USERS FIND YOU AT THE VENUE?
'HOW TO FIND YOU'

MEETING DESCRIPTION
- WHO SHOULD COME
- WHY JOIN US
- DETAILS

MEETING PHOTO | UPLOAD PHOTO
              | BROWSE

RSVP SETTINGS
- ☐ UP TO ___ PEOPLE CAN ATTEND
- ☐ A NEW LOCATION
- ☐ I'LL PICK A LOCATION LATER
- ☐ CLOSE FROM NOW ON
- ☐ ALLOW MAYBE RSVPS
- ☐ ALLOW ___ GUESTS / USER
- ☐ EMAIL ORGANIZER WHEN USERS RSVP
- ☐ SEND AUTOMATIC ANNOUNCMENTS / REMINDERS
- ☐ FEE: ___

ORGANIZER'S CHECKLIST
TIPS TO HELP YOU BECOME A SUCCESSFUL ORGANIZER

1300

LAUNCH YOUR GROUP
- ☐ WRITE A MEETING NAME
- ☐ WRITE A DESCRIPTION
- ☐ ADD TOPICS
- ☐ ADD PROFILE INFORMATION
- ☐ UPLOAD A PHOTO
- ☐ ADD WECOME NOTE
- ☐ START FIRST MEETING

SELECT A VENUE
- ☐ PICK A PART OF TOWN
- ☐ ASK FOR SUGGESTIONS
- ☐ POLL MEMBERS
- ☐ CONTACT BUSINESSES
- ☐ CONTACT OR VISIT VENUE

KEEP MOMENTUM
- ☐ SCHEDULE NEXT MEETING
- ☐ EMAIL RECAP
- ☐ ENCOURAGE RSVP
- ☐ POST PHOTOS
- ☐ GET MEMBERS TO POST
- ☐ SOLICIT SURVEY RESPONSE
- ☐ DON'T GET DISCOURAGED

CONTACT MEMEBERS
- ☐ EMAIL NEW MEMBERS
- ☐ ENCOURAGE PROFILE DEV.
- ☐ MAILING LISTS & MESS. BD
- ☐ PROFILE QUESTIONS
- ☐ ASK MEMBERS TO HELP
- ☐ GET MEMBER FEEDBACK

SET UP MEETING
- ☐ CREATE INTEREST
- ☐ WRITE DISCRIPTION
- ☐ PICK DATE AND TIME
- ☐ RSVP FOR THE MEETING
- ☐ SELECT A VENUE

MEETING PURPOSE
- ☐ PRINT SIGN UP
- ☐ SEND REMINDER
- ☐ PRINT NAMES AND PHOTOS
- ☐ BRING A CAMERA
- ☐ PRINT CHECKLIST

HOST YOUR MEETING
- ☐ GET THERE EARLY
- ☐ PUT UP A SIGN
- ☐ WELCOME EVERY MEMBER
- ☐ ENCOURAGE WELCOMING

PROMOTE GROUP
- ☐ INVITE FROM ALERT LIST
- ☐ PROMOTE GROUP ONLINE
- ☐ ADD 'ABOUT US' PAGE
- ☐ CREATE BUSINESS CARDS
- ☐ RECRUIT MEMBERS

NEED MORE HELP?
- ☐ WATCH THIS VIDEO
- ☐ BROWSE OTHER GROUPS
- ☐ GET IDEAS FROM MESS. BD
- ☐ ATTEND ORG SEMINAR
- ☐ PICK AN ASSISTANT
- ☐ VISIT RESOUCE CENTER

WELCOME, BROOKLYN VEGETARIAN FOODIES!

LOVE GREAT FOOD, ESPECIALLY ETHNIC FOOD? LOVE FINDING RESTAURANTS THAT HAVE VEGETARIAN SELECTIONS OTHER THAN THE DREADED 'STEAMED VEGGIE' PLATE? THEN THIS IS THE MEETING GROUP FOR YOU!

WE'LL BE GOING TO ALL SORTS OF RESTAURANTS – NOT JUST EXCLUSIVELY VEGETARIAN RESTAURANTS – AND TRYING OUT THEIR VEGETARIAN FARE.

[EDIT DISCRIPTION]

MEETING GROUP TOPICS: VEGETARIAN, DINING OUT

[MANAGE TOPICS]

| LOCATION: BROOKLYN, NY | MEETINGS: 16 SO FAR |
| MEMBERS: 54 VEGETARIAN FOODIES | FOUNDED: NOVEMBER 8, 200x |
| MEMBER FEE: NONE – IT'S FREE! | RATING: ★★★★☆ |

WHAT'S NEW?

MAY 19: NEW MEMBER, JUSTIN    [MEMBER PHOTO]

MAY 8: NEW MEETING

APRIL 15: NEW MEETING

- SCHEDULE A MEETING
- EMAIL THE GROUP
- ORGANIZER'S CHECKLIST
- WELCOME
- ABOUT US
- CALANDAR
- MEMBERS
- PHOTOS
- MESSAGES
- POLES
- FILES
- PROMOTE
- ORGANIZER PHOTO AND NAME

FIG. 14

| CALENDAR | | | | | | | |
|---|---|---|---|---|---|---|---|
| [SCHEDULE A MEETING][POST A NOTE] | | | | | | | |
| CALENDAR VIEW | UPCOMING LIST VIEW | PAST LIST VIEW | | | | | |
| SUN | MON | TUE | WED | THU | FRI | SAT | |
| 1 | 2 | 3 | 4 | 5 | 6 | 7 | |
| | | | 7PM MEET RSVP | | | 9AM MEET RSVP | |
| 8 | 9 | 10 | 11 | 12 | 13 | 14 | |
| 11AM MEET RSVP | | | | | | | |

| Left sidebar | ORGANIZER RESOURCES |
|---|---|
| SCHEDULE A MEETING | |
| EMAIL MEMBERS | |
| ORGANIZER RESOURCES | |
| GROUP SETTINGS | |
| OUR HOME | |
| ABOUT US | |
| CALENDAR | |
| MEMBERS | |
| PHOTOS | |
| MAILING LIST | |
| MESSAGE BOARD | |
| POLLS | |
| FILES | |
| PROMOTE | |

THE ORGANIZER'S CHECKLIST
WHAT SHOULD YOU DO NEXT? CHECK OFF EACH COMPLETED.

ORGANIZER RESOUCE CENTER
CHECK OUT THE EVER-GROWING COLLECTION OF ARTICLES ABOUT MAKING YOUR GROUP A SUCCESS.

ORGANIZER MESSAGE BOARDS
DISCUSS THE INS AND OUTS OF RUNNING A GROUP WITH OUR SAVIEST MEMBERS

PROMOTE YOU GROUP
NEED HELP GETTING THE WORK OUT? FIND OUT HOW TO PROMOTE YOU GROUP BOTH ONLINE AND OFLINE.

FREQUENTLY ASKED QUESTIONS
NEED BASIC INFORMATION?

CONTACT SUPPORT
EMAIL US YOU QUESTIONS, AND CONCERNS. WE'RE HERE TO HELP!

FIND GROUP NEAR YOU
MEET OTHER ORGANIZERS IN YOUR AREA AND SWAP IDEAS.

PAYMENTS YOU'VE COLLECTED
WE'VE MADE IT EASIER FOR YOU TO COLLECT PAYMENTS FROM YOUR MEMBERS. VIEW AND EDIT DETAILED TRANSATION INFORMATION, ISSUE REFUNDS, AND MORE!

1700

NEW YORK, NY
5,262 MEETING GROUPS WITHIN [100 MILES]

WHAT'S HAPPENING THIS WEEK?

| IMAGE | IMAGE | IMAGE | IMAGE | IMAGE | IMAGE | IMAGE |
|---|---|---|---|---|---|---|
| TUE 95 MEETINGS | WED 100 MEETINGS | THU 73 MEETINGS | FRI 39 MEETINGS | SAT 53 MEETINGS | SUN 76 MEETINGS | MON 130 MEETINGS |

TUESDAY, [DATE]

2:00 PM

THE MAMARONECK MAH JONG MEETING
THE MAMARONECK MAH JONG MEETING GROUP

6:00 PM

THE NEW YORK GUILDED MEDITATION MEETING
THE NEW YORK GUILDED MEDITATION MEETING GROUP

INDEPENDENT CREATIVE CLUB OF GREATER HARTFORD MAY MEETING
INDEPENDENT CREATIVE CLUB OF GREATER HARTFORD

SPIN RADIO NYC: THE NIGHT LIFE & SOCIAL NETWORKING GROUP MEETING
SPIN RADIO NYC: THE NIGHT LIFE & SOCIAL NETWORKING GROUP

TEST OLD TIME RADIO MEETING GROUP II HAS A PHOTO. MAY MEETING
TEST OLD TIME RADIO MEETING GROUP II HAS A PHOTO

CHARGE MEMBERS TO ATTEND THIS MEETUP?
COVER YOUR COSTS, RESERVE A VENUE, OR EVEN PAY YOURSELF!

☐ YES, USING [AMAZON PAYMENTS]

ATTENDEES PAY A PRICE OF [ $ 20.00 ]

YOU PAY AMAZON FEE         - $ 0.88

MEETING FEE WAIVED          $̶ ̶0̶.̶5̶0̶

YOU WILL RECEIVE            [ $ 19.12 ]

☐ REQUIRE PAYMENT TO RSVP (REDUCES NO-SHOWS)

REFUND POLICY
MEMBERS WILL READ AND ACCEPT THIS POLICY WHEN THEY RSVP 'YES'

○ NO REFUNDS ARE OFFERED
○ I WILL REFUND MEMBERS IF...
  ☐ THE MEETING IS CANCELLED
  ☐ THE MEETING IS RESCHEDULED
  ☐ THE MEMBER CANCELS ____ DAY(S) IN ADVANCE OF THE MEETING

FIG. 19

JUNE RUSSIAN MEETUP
THURSDAY, [DATE] [TIME] – THE BROOKLYN RUSSIAN LANGUAGE MEETING GROUP

1900

| NAME | QUANTITY | PINGPONG | TOTAL | CONF. # |
|------|----------|----------|-------|---------|
| OLIVER | 1 | $10.00 | $10.00 | A263 |

MEETING VENUE ADDRESS

MEETING AGENDA

MAP – WITH MEETING LOCATION SHOWN

ORGANIZED BY: _____

ORGANIZER'A REFUND POLICY: _____

BAR CODE

PAYMENTS YOU'VE RECEIVED
FOR: JUNE ORGANIZER MEETING

MEETUP:                GROUP:                          TOTAL ONLINE:    $124.50
JUNE ORGANIZER MEETING THE NY ORGANIZER MEETING        TOTAL OFFLINE:      0.00

WHEN:                  PRICE:                          GROSS REVENUE:   $124.50
[DATE AND TIME]        $41/50 (REQUIRED FOR RSVP)      FEES             - $4.51

CURRENT RSVPS:         RSVP LIMIT:                     NET REVENUE      $119.99
3                      0

REFUND POLICY:
REFUNDS ARE OFFERED ONLY UNDER THE FOLLOWING
CIRCUMSTANCES:
    -THE EVENT IS CANCELLED
    -THE EVENT IS RESCHEDULED

| CONF# | NAME   | DATE   | QTY | PRICE   | FEE    | ACTION |
|-------|--------|--------|-----|---------|--------|--------|
| A229  | TERESA | MAY 15 | 1   | $41.50  | $1.50  |        |
| A226  | KEITH  | MAY 15 | 1   | $41.50  | $1.50  |        |
| A216  | MARK   | MAY 15 | 1   | $41.50  | $1.50  |        |

FIG. 22

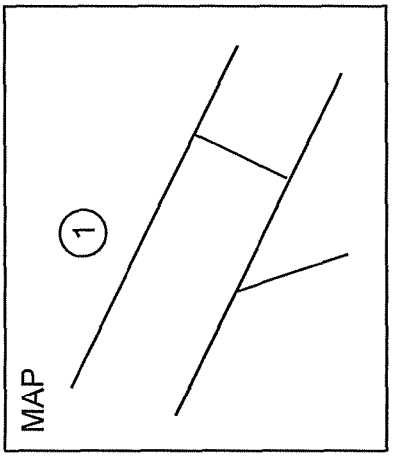

Denim Lounge
This venue is shared
Go back   Edit   Directions   Hold meeting here RATED: ★★★★☆ BY 5 PEOPLE
DENIM LOUNGE
1223 BEDFORD AVE
BROOKLYN, NY
(718) 230-9010
WWW.DENIMLOUNGE.COM TAGS:
SERVES ALCOHOL, PARKING, PET FRIENDLY, SMOKING, RESERVATION POLICY, BACK GARDEN, BOTTLE SERVICE, COOL, CUTE, FRIENDLY TO LARGE GROUPS, GARDEN, LOTS OF COUCHES. [ADD MORE]

REVIEWS FROM THE MEETUP COMMUNITY
FILTER BY: MEMBERS AND ORGANIZERS   POSTED

| PERSONAL PHOTO | ★★★★☆ "DENIM LOUNGE IS CUTE!" - A MEETING MEMBER | MONDAY [DATE] |
| PERSONAL PHOTO | ★★★★☆ "DENIM LOUNGE IS CUTE!" - A MEETING MEMBER | TUESDAY [DATE] |

MAP

UPCOMING MEETINGS

DATE/TIME   VEGETARIANS IN JAPAN!
TWO ATTENDING   THE NYC VEGETARIAN DINING MEETING GROUP

PAST MEETINGS

DATE/TIME   LET'S ENJOY VEGETARIAN FOOD!
ONE ATTENDED   THE NYC VEGETARIAN DINING MEETING GROUP

2200

WEB BASED INTERACTIVE MEETING FACILITY

CROSS-REFERENCE TO RELATED APPLICATIONS

This application claims the benefit of the following provisional application, which is hereby incorporated by reference in its entirety: U.S. provisional App. No. 61/060,321 filed Jun. 10, 2008.

This application is a continuation-in-part of the following U.S. patent applications, each of which is incorporated by reference in its entirety: U.S. application Ser. No. 10/710,055 filed Jun. 15, 2004, which claimed priority to U.S. provisional App. No. 60/478,345 filed Jun. 16, 2003.

BACKGROUND OF THE INVENTION

1. Field of the Invention

A system and a method consistent with the present invention broadly relates to organizing real-world gatherings. More particularly, the present invention is consistent with providing an automated, computer-assisted system and a method for organizing a real-world gathering for a particular topic of interest.

2. Description of the Related Art

In social networking, people are often interested in forming groups centered on common interests. In the past, groups might form within the confines of a social or organizational setting, such as a school, community center, private club, or the like. Today the Internet offers a much more powerful tool for social networking. However, there still lacks an Internet social networking facility that provides a centralized way for people to manage in-person meeting groups through the Internet, and as such, help maintain ongoing local interest groups.

The Internet now is one of the most popular sources for obtaining and sharing information. One popular activity associated with the Internet is communication between people, and notably people who may be separated by vast distances. Some familiar technologies that facilitate communication and involve the Internet include email, bulletin boards, virtual chat rooms, blogs, and instant message systems. This set of technologies, and those that are similar, are characterized by being substantially solely on-line.

In other words, the foregoing set of well-known Internet related applications support geographically distributed communications, and do not have as their objective anything more.

In spite of the increased ability to communicate on-line, however, many people still are interested in meeting together in person with other people who are interested in the same topic. What is needed is a way to harness the formidable communications capabilities of the Internet to help support and facilitate such in-person topic-related gatherings (herein, "gatherings" and "meetings" shall be interchangeably used, and shall unless otherwise noted refer to in-person gatherings).

The challenges of organizing real-world gatherings are much different from those of organizing online meetings. For example, to engage in online chat, there is no question of physical location, distance from home, availability of venue, or the like. All of the foregoing considerations and more, including intangibles such as social dynamics, make organizing real-world gatherings a more difficult and complex task.

Known Internet communication tools are insufficient for the task. In particular, email alone is inadequate because a person in one area has no organized way of approaching the problem of finding the identities and addresses of others in his area who are interested in a given topic and also interested in a topic-related meeting. Instant messaging and chat rooms alone are likewise inadequate for the same reasons.

Message boards and blogs are insufficient by themselves because these tools are not designed to allow a person to begin with a topic of interest, find an associated message board or blog that is relevant to the topic, and identify participants of the board or blog who are in a person's area and who are interested in an in-person topic-related meeting.

Internet dating and introduction services are related to the idea of in-person meetings, but only on a one-to-one model, and all of these services are agnostic with respect to a particular topic of interest; instead, such services focus on compatibility with the idea of forming a relationship and not on meeting in a group setting to discuss a given topic of mutual interest. In effect, these services facilitate only one-off (non-recurring) gatherings in only a single geographical locale.

Internet newsgroups are topic related, but provide no support to a person who wants to attend a topic-related meeting in person in his own geographic area.

Additionally, so-called "social networking" services, such as SixDegrees, provide a system for users to be introduced to friends of friends via website communication and/or email, but again provide no support to a person who wants to attend a topic-related gathering in person in a selected geographic area.

Internet invitation services likewise are inadequate to fulfill the above-identified need. Such services, of which. Evite is an example, allow users to enter the email addresses of invitees to private events. Automated invitations are sent by the service, and each invitee may accept or decline the invitation. Separately, users may browse or search the Evite website directory of public events, but all the events are one-off, non-recurring events, and all the events must be submitted by individual users choosing to publicize already existing events. It is impossible for persons who are not already acquainted to use the system to self-organize into groups, and to attend topic-related in-person gatherings with others in a given locale. Evite thus does not provide an automated method for strangers with a common interest to self-organize into real-world, local groups.

General information postings, such as ads or articles in print media and signs posted around town, are well known. This approach starts with a meeting at a date and time certain, and then advertises the meeting. Posting such notices in common locations such as a town square or popular bulletin board is now possible online as well. One such example of this approach is a "craigslist" type website (see, e.g., dc.craigslist.com), where people wishing to advertise meetings can easily make such a posting. Such posting approaches, however, are limited in that they begin with a predetermined meeting location, date, and time, and require a group already to be formed. No self-formation of groups takes place, and the location of the posted meeting cannot be determined by those interested in attending. Furthermore, the posted events are typically one-off, non-recurring events. Any group continuity depends on the efforts of the person doing the posting, and no support along these lines is provided by the website.

SUMMARY OF THE INVENTION

An objective of the invention, among other objectives which will become apparent from reading the description herein, is to provide an automated system to overcome the above-mentioned problems by facilitating local in-person gatherings of people brought together by a common interest.

One embodiment of the invention is a fully automated system in which the facilitation of such meetings does not include a person being designated as a group leader. Another embodiment of the invention provides for a group leader. In the description below, the invention will be taught first according to the leaderless embodiment, and afterward according to an embodiment that includes the concept of a group leader. Alternative embodiments will be presented as part of the discussion.

The below-described illustrative, non-limiting embodiments of the present invention overcome the above disadvantages and problems in the prior art, and also may provide solutions to other disadvantages and problems that were not described above. Also, a system that operates according to the teachings of the present invention is not necessarily required to overcome any of the particular problems or disadvantages described above. The appended claims should be consulted to ascertain the true scope of the invention.

It is an aspect of the present invention to provide a system and a method consistent with facilitating the creation, organizing, scheduling, and joining of in-person (also referred to as "real-world") group gatherings around a topic of interest.

It is another aspect of the present invention to provide a system and a method consistent with organizing real-world gatherings on the same day in multiple localities for a particular topic of interest.

It is yet another aspect of the present invention to provide a system and a method consistent with facilitating voting by prospective participants on a venue for the real-world gathering for the topic of interest in a particular locale.

According to an embodiment of the present invention, a computer-assisted system and a method is provided for organizing gatherings. Gatherings may be periodic. They may be characterized as having a predetermined minimum number of participants. A given gathering may occur at a physical location determined by consensus or voting. The method is topic-focused, and involves selecting a topic of interest, and also includes indicating a geographical area for one or more of the periodic gatherings. Furthermore, the method may involve selecting a physical location from a predetermined set of available physical locations within the indicated geographical area. The selection of the physical location may be based on one or more characteristics of the selected topic of interest. Once the physical location is selected, each participant or potential participant may be notified of the next gathering and of the selected physical location. A request for a response/reservation may be sent. The number of reservations may be counted or otherwise determined, and when too few reservations are made, the system may cancel the next gathering and notify the participants of the cancellation. Moreover, according to another embodiment of the present invention, the computer-assisted system and method further includes receiving and storing a location associated with a particular participant, and retrieving and providing the particular participant with a number of potential venues for having a gathering based on the identified topic of interest, according to the received location. The method according to this embodiment further includes voting on a preferred venue chosen from a number of potential venues and storing the results.

The system may then determine one or more actual venues based on the results from all the common participants who provided related locations and whether a minimum number of common participants exist by comparing a number of confirmed attendees with a threshold value. When at least the minimum number of common participants exists, a gathering on the identified topic of interest is scheduled to occur at the determined one or more actual venues. Once the gatherings are scheduled, the common participants are notified.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE DRAWINGS

The invention and the following detailed description of certain embodiments thereof may be understood by reference to the following figures:

FIG. 1 shows a specific embodiment of a highest level of a hierarchical arrangement of topics according to an embodiment of the invention.

FIG. 2 shows a specific example of a second-highest level of a hierarchical arrangement of topics according to an embodiment of the invention.

FIG. 12 depicts an embodiment of a start planning meetings with new organizer group home page.

FIG. 13 depicts an embodiment of an organizer's checklist page.

FIG. 14 depicts an embodiment of a meeting group home page.

FIG. 15 depicts an embodiment of a calendar page.

FIG. 16 depicts an embodiment of an organizer resources page.

FIG. 17 depicts an embodiment of a city calendar page.

FIG. 18 depicts an embodiment of a creating an event page.

FIG. 19 depicts an embodiment of a printable ticket.

FIG. 20 depicts an embodiment of a payments received page with a detailed view of an event with payments turned on.

FIG. 22 depicts an embodiment of a venue details page.

Figure 3:
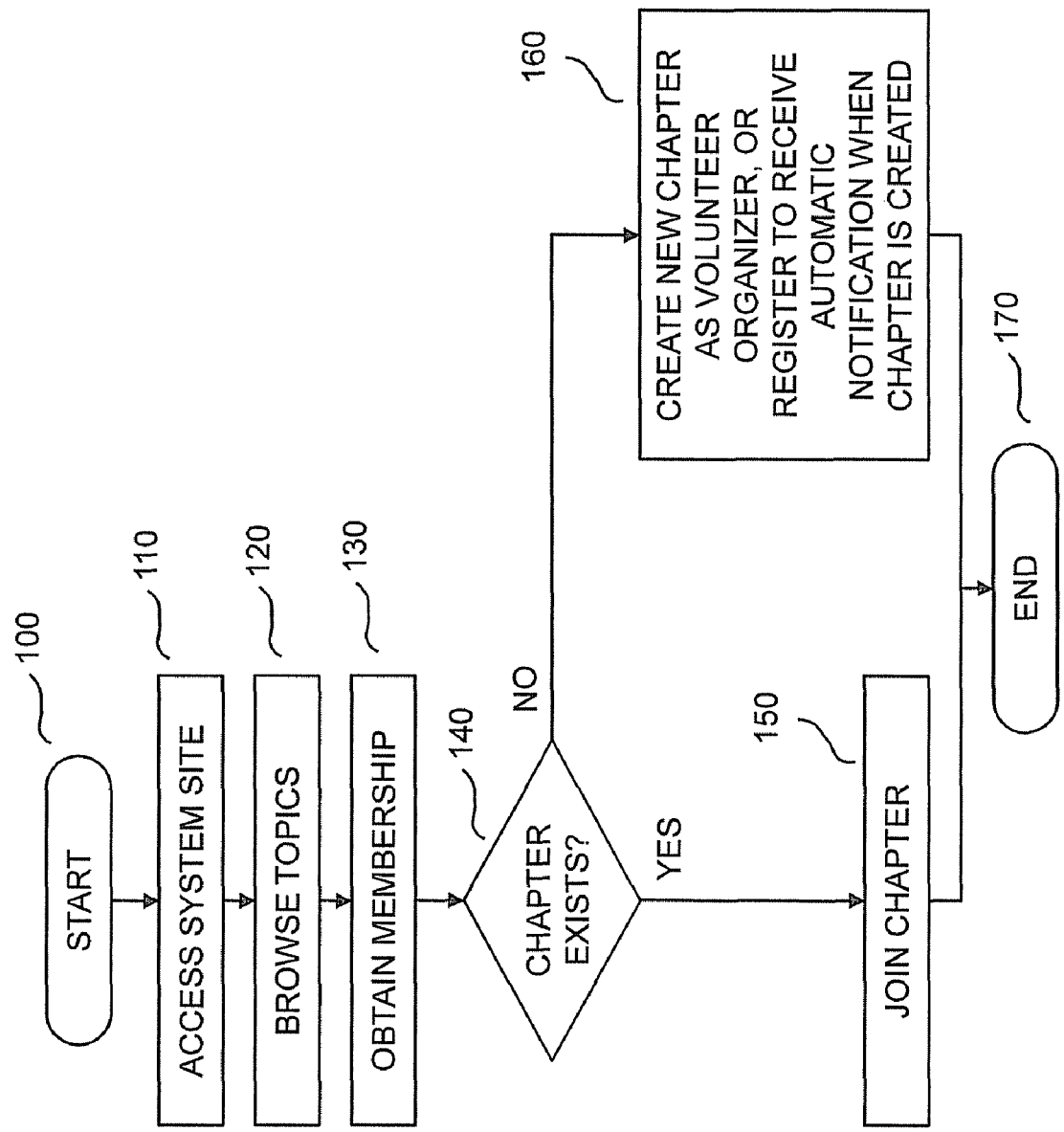
FIG. 3 shows an exemplary flow diagram for a part of the processing according to one embodiment of the invention.

While the invention has been described in connection with certain preferred embodiments, other embodiments would be understood by one of ordinary skill in the art and are encompassed herein.

All documents referenced herein are hereby incorporated by reference.

DESCRIPTION OF THE PREFERRED EMBODIMENTS

The present invention will now be described in detail by describing various illustrative, non-limiting embodiments thereof with reference to the accompanying drawings. The invention may, however, be embodied in many different forms and should not be construed as being limited to the illustrative embodiments set forth herein. Rather, the embodiments are provided so that this disclosure will be thorough and complete, and will fully convey the concept of the invention to those skilled in the art. The claims should be consulted to ascertain the true scope of the invention.

This illustrative, non-limiting embodiment of the present invention is a software application that organizes real-world group gatherings around a topic of interest. The software application can be delivered to the user via a web-based graphical user interface. The software application can also be deployed over a dedicated computer network (e.g., a LAN or a WAN), or via a stand-alone computer system for a particular company, such as an intranet installation, or by some other means. For simplicity and ease of discussion, various illustrative, non-limiting embodiments of the present invention will be described with reference to an Internet/world wide web-based system, with the understanding that networks or communications systems similar to, but not identical with the Internet, may of course be used.

On a practical level, the software that enables the computer system to perform the operations described in further detail below may be supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of ordinary skill in the art will appreciate that "media", or "computer-readable media", as used here, may include a diskette, a tape, a compact disc, an integrated circuit, a ROM, a CD, a cartridge, a remote transmission via a communications circuit, or any other similar medium useable by computers now known or hereafter developed. For example, to supply software for enabling a computer system to operate in accordance with the invention, the supplier might provide a diskette or might transmit the software in some form via satellite transmission, via a direct telephone link, or via the Internet. Thus, the term, "computer readable medium" is intended to include all of the foregoing and any other medium by which software may be provided to a computer.

Although the enabling software might be "written on" a diskette, "stored in" an integrated circuit, or "carried over" a communications circuit, it will be appreciated that, for the purposes of this application, the computer usable medium will be referred to as "including" the software. Thus, the term "including" is intended to encompass the above and all equivalent ways in which software is associated with a computer usable medium. For the sake of simplicity, therefore, the term "program product" is thus used to refer to a computer useable medium, as defined above, which includes in any, form of software to enable a computer system to operate according to the above-identified invention. Thus, the invention is also embodied in a program product including software instructions which enable a computer or computers to organize a real-world gathering for a particular topic of interest according to the invention.

In this illustrative, non-limiting embodiment, the system allows for an automated organization of a real-world gathering of two or more individuals around a common topic of interest. The gatherings are real-world, face-to-face meetings that take place in a number of cities and small towns in various countries around the world. The gatherings can take place at various venues such as local cafes, restaurants, stores, bar or other establishments.

The following terms are used throughout the specification and are defined as follows:

Topic: A subject or interest around which members of the system form groups, e.g., Pug Owners, Spanish Language, Environmental Defense.

Locale: A defined geographical location, even including definitions such as the area within a radius from a given zip or postal code.

Chapter: This is the intersection of a topic and a locale, e.g., Pug Owners, Louisville, Ky. In other words, it is a group of members organized locally around a topic of interest.

Gathering: A real-life, face-to-face meeting of a chapter. A gathering may be a periodic gathering, such as a monthly gathering, although other frequencies can be used. A gathering may be referred to as an in-person meeting, or a Meetup (Meetup is a trademark of Meetup, Inc.).

Organizer: Member who chooses to start and run a local chapter.

Venue: This is a meeting place, which may be suggested by the system or a member, e.g., a restaurant, a cafe, a park, a library, a private home, etc.

A system according to this embodiment of the invention automates the organization of real-world gatherings around a topic of interest. A visitor to the system (which may be referred to as a member or participant) typically provides his or her location via a zip code, postal code, or city, then searches or browses for a topic of interest, e.g., Spanish Language. The system may return a list of local chapters that meet for Spanish Language conversation practice, sorted by distance from the user's location. In addition, the visitor can search for a topic of interest without providing a locale. That is to say, the order of providing locale information and topic of interest information is not critical in this embodiment.

The topics of interest and the locales may be organized using a multiple-level hierarchy. For example, as shown in FIG. 1, a set of highest level topics may be defined, and linked to sub-topics in a known manner. Activating the link to "Language" in the set of highest level topics may result in a display of sub-topics such as shown, for example, in FIG. 2.

FIG. 2 represents an embodiment in which, regardless of the user's locale, there is defined a date and time certain for the topic. Thus, a user interested in the particular topic of "Spanish Language" can, in the embodiment shown in FIG. 2, be provided with the worldwide date and time for the in-person meeting relating to the Spanish language, independent of locale.

Going further with the example, assuming the user has already provided his locale information by indicating a relevant zip code, city name, latitude/longitude information, or the like, information about the next meeting or gathering of the local chapter for the particular topic may be provided by activating the "Spanish Language" link.

In the situation in which no chapter existed already in the user's locale, the user could be presented with nearby locales having chapters for that particular topic. In one instance of the invention, the system will automatically instantiate a chapter when a user searches for a topic and a locale where no chapter currently exists.

Instead of searching through a hierarchy of topics, the system may provide a user with the ability to carry out a keyword-based search. It will be appreciated that other variations on topic selection are possible and are within the scope of the invention.

When the user searches for a topic of interest without the locale being known by the system, the user may be provided with the topic information and the information about all the chapters associated with this topic. Once the visitor selects and/or finds a locale and a topic of interest, the visitor has found a chapter (it will be recalled from the definitions section, above, that the chapter is an intersection of a particular topic and a locale).

The visitor may be presented with available information about the chapter, including, without limitation: a number of members in the chapter, member photos and biographies, a chapter creation date, a brief description of the chapter, a longer description, a calendar of events, event photos, message boards and so on. In the embodiment in which there is a chapter organizer, the organizer's identity may be indicated along with relevant organizer information.

In addition, a local chapter may also provide information about other chapters worldwide. This information may include details on nearby chapters, numbers of members worldwide, photos of members worldwide, and links to their message boards.

The system may also provide communications tools for members to communicate between chapters, e.g., a topic-level message board "General Spanish Language Board" and web logging tools "General Spanish Language Blog." Chapter information may be split up into a number of logical parts, which can be easily navigated e.g., through the use of tabs. Those familiar with this field will understand that other variations are possible and are within the scope of the invention.

In this exemplary system, gatherings may be organized for one or more types of chapters. One type of chapter is a leaderless chapter, according to a first embodiment of the invention. In a leaderless chapter, the system operates completely automatically, including fully automatic selection of the date and the time for the gathering, and the candidate venues for the users. That is, a gathering is automatically scheduled by the system.

In the first embodiment of the invention, there may be provided a system administrator who has a manual override capability to handle special scheduling problems, but a feature of the first embodiment is that there is provided a fully automated manner of facilitating in-person, topic-related meetings of persons, by geographic area. For the sake of linguistic convenience, a chapter according to this first embodiment of the invention may be referred to as a leaderless chapter.

According to a second embodiment of the invention, there is provided another type of chapter, having a person who is denominated as an organizer. It will be understood that "organizer" is used as a term of linguistic convenience, and is meant to generally refer to the idea of a person who is a contact person, and allows for situations in which the organizer is a group leader, a moderator, a facilitator, a secretary, or any other similar role. It will be understood that the automated system is performing an important and significant amount of the organizing itself.

A chapter according to this second embodiment of the invention, having an organizer, may be thought of for the sake of linguistic convenience, as a led chapter.

In a led chapter, local organizers are free to take part in the larger event, and/or to set their own day and time to meet. In one embodiment, organizers may select from a list of other chapters and topics to affiliate with. For example, the organizer of a local Christian Athletes chapter is provided by the system the ability to indicate an affiliation with the local Bible Study chapter as well as with other Christian Athletes chapters in nearby towns. That is, affiliations can be geographical and/or topical. Such affiliations may be listed on that organizer's local chapter home page.

Organizers, according to another embodiment, can allow the system to create an automatic voting ballot of two or more candidate venues (i.e., utilize a predetermined set of venues already in the system), but make changes prior to releasing the voting ballot for voting. The organizer may add extra venues, or replace venues on the system's voting ballot. Moreover, the organizer may nominate new venues, including private homes (i.e., utilize a set of venues that was not selected from the predetermined set of venues already in the system).

In another embodiment, the organizer may simply choose a venue for the gathering, thereby overriding the need to vote.

Organizers may be provided with tools for managing their chapter. They may use the system to send notifications and messages directly to members. They may create polls and ballots to survey members on particular subjects, for example, choosing activities or agenda items. They may limit or terminate membership in the chapter, and grant member privileges such as the ability to choose or nominate a venue, edit messages, edit profile information, and so on.

In general, the system may require a user become a member before providing any specific information about chapters or members. For example, the system may require the user to furnish a verifiable email address and a password as a pre-condition of membership, or other information as well, including a zip code or other geographic locale indicator.

Once a member, a user may be permitted to join a local chapter of any type. The user may then receive a welcome message and an automated email notification of a real-life, face-to-face gathering. In addition, the user may set his profile for the chapter including nicknames (usernames), personal biographical or other information, personal pictures, email contact options (allowing other members of the chapter to contact them), and other related information. The member may set up different profiles for different chapters. In addition, the member may set up alerts. For example, the member may set up an alert to receive a notification when a new message is posted to the message board.

The members may volunteer to be a host for an upcoming gathering. A host is different from an organizer, although both functions could of course be performed by the same person at a given time. A host is an attendee of a gathering who helps get the meeting started by helping attendees find each other. The host function is important because the people who attend a meeting may never have met, and because the venue may be large or noisy, making it difficult for such persons to actually connect with each other.

A host may perform some simple tasks to facilitate the gathering, such as printing out a sign and putting it on a tabletop, or bringing nametags and a marker. According to one embodiment of the invention, the system includes functions for automatically generating flyers, nametags, and/or table top signs for the chapter. The message on such promotional materials is specific to each chapter. The host just needs to print them out and bring them to the gathering.

According to one embodiment of the invention, the system may automatically schedule a worldwide or nationwide repeating gathering day, such as an "International Spanish Language Day." According to this embodiment, the system may schedule the periodic gathering for all chapters of the "Spanish Language" particular topic on the same day, and optionally at the same time, all over the world. Here, "at the same time" can mean an identical local time, in which case the chapters in different time zones are not meeting contemporaneously. It can also mean an identical time regardless of time zone, such as a standard time for chapters to meet all across the world. In other words, for a given topic, an identical calendar date and optionally an identical time is used for the automatic scheduling of the in-person gatherings for all of the chapters associated with the topic.

According to another embodiment, local chapters may set their own day and time to meet by carrying out a voting operation facilitated by the system or by a chapter organizer setting a day, time and recurrence using tools provided by the system.

The advantages of a worldwide or national gathering day are several. For example, assume the particular topic "Yoga" has a worldwide gathering day of the first Saturday of every month at 12 pm. A local Yoga chapter gathering at 12 pm on the first Saturday of the month in Washington D.C. knows that Yoga chapters all over the world are gathering at their own local time. Because of this arrangement, national media can be used to inform the public of such meetings, and national organizations can direct people to the local version of the topic, e.g., the Yoga chapters can announce that Monday, April 12th is this month's Yoga day. By providing a single website URL, for example, interested persons can automatically be directed to the local chapter nearest them. Likewise, using the system itself, interested persons can select "Yoga" as a topic of interest, and provide their geographic locale information, and be directed to the nearest chapter.

Furthermore, the automatic, periodic scheduling of a gathering, whether worldwide or only local, constitutes a means whereby the system (which may have automatically formed a chapter out of a group of strangers) automatically takes the steps necessary to keep the group alive on an ongoing basis. The system therefore not only automatically helps groups emerge, but also helps sustain them.

An exemplary embodiment of the invention will now be described with respect to FIG. 3, in which one example for implementing part of a system according to the invention will be described.

FIG. 3 shows one way to add new members to chapters. The process begins at step 100 which assumes that the user has some means for accessing the Internet, such as a personal computer, web-enabled phone, web-enabled television, connected PDA, or other Internet capable appliance. Step 100 also assumes that the user's appliance also has some communication means for accessing the internet, such as a dial-up service, a wired service, a wireless service, or the like.

In step 110, the user accesses a web site of the system according to the invention. The user may be provided with a variety of information, such as the already mentioned capability to search topic by keyword, or hierarchical list, or the like. The user takes advantage of such capabilities, and browses through the topics according to his personal interest in step 120, eventually selecting a topic of interest. The system thus receives a user selection of a topic from the plurality of predefined topics.

In step 130, the user is prompted to obtain a membership by providing, for example, a verifiable email address or the like, and information about the locale in which the user may be considered normally to exist. The information about the locale may be thought of as a user indication of a geographic locale. It is possible to grant membership in any of a variety of ways known to those familiar with this field. Once the membership is obtained, processing continues to step 140.

In step 140, a determination is made as to whether a chapter, corresponding to the geographic locale and the topic, exists. If so, processing may continue to step 150 in which the user is added to the chapter that corresponds to the selected topic and the geographic locale to which the user belongs. Another way to put this is to say the user may be added to a chapter selected on the basis of a topic and a locale. The adding of the user to the chapter as a member may be automatic or in response to a user indication. The system provides an indication to the user of the one chapter that was determined based on the topic and the geographic locale. The user may also be provided with information relating to the respective members of the chapter and the date and time of the next gathering. The user may take an action to indicate that he or should would like to become a member of the chapter, and to receive notification of chapter gatherings and activities, or the membership assignment may automatically be performed.

When no chapter exists, processing continues to step 160 in which a user may volunteer to create a new chapter as a volunteer organizer (according to the second embodiment of the invention described above) or, wait until a chapter is formed (automatically as in the first embodiment or otherwise). If the user volunteers to organize a new chapter, this indication is made by the user to the system and may be thought of as an organizer volunteer indication. If the user waits until a chapter is formed, the system may send an automatic notification of the chapter's creation to interested persons such as the user.

Processing ends in step 170 in FIG. 3, but it will be appreciated that the steps need not be performed necessarily in the order just mentioned, and it will also be appreciated that a member may join a number of different chapters in the locale depending on the interests of the member.

Figure 4:
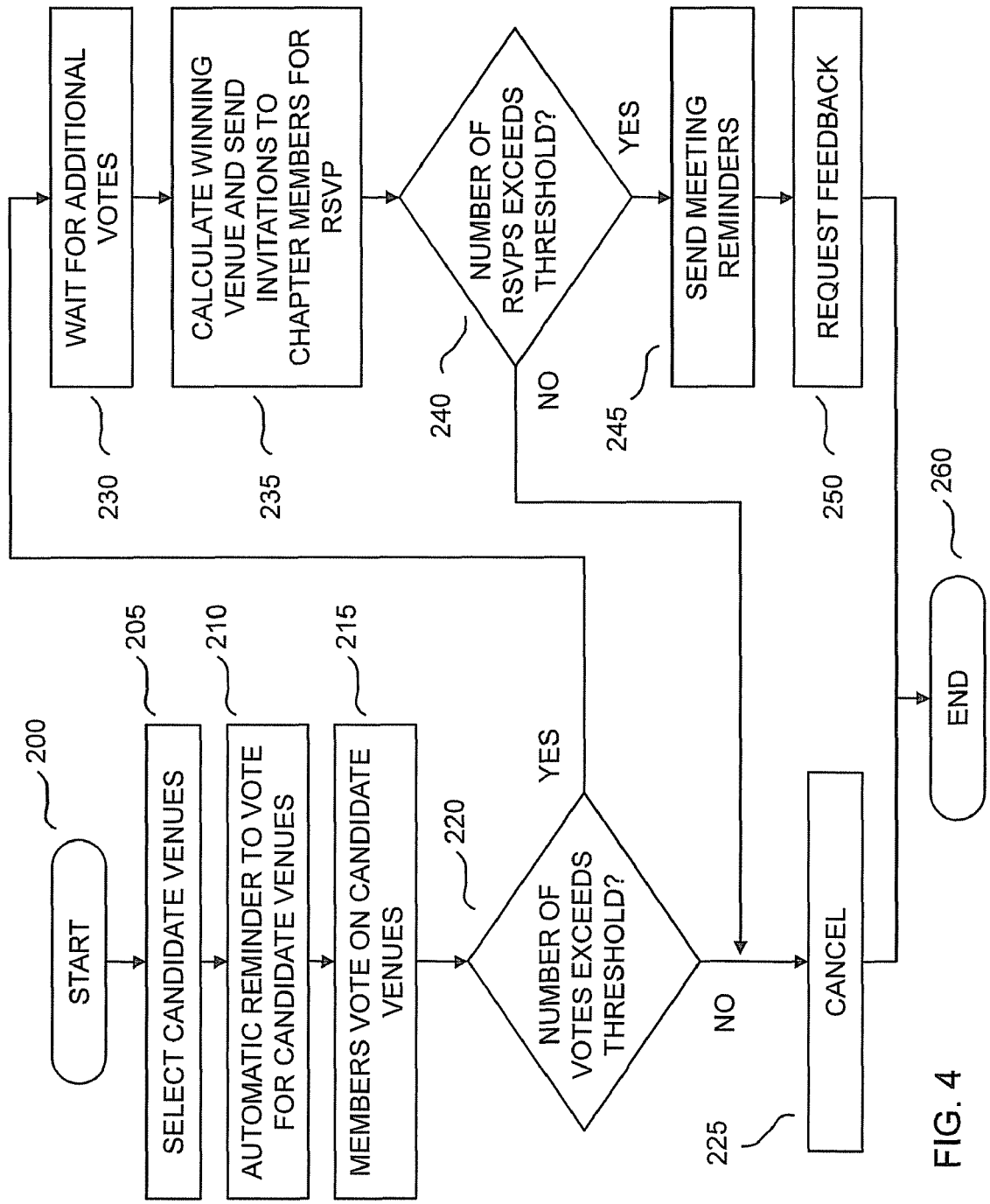
FIG. 4 shows an exemplary flow diagram of another part of the processing according to an embodiment of the invention.

FIG. 4 shows one manner of implementing part of a system according to the invention, in which the automatic scheduling of a meeting is performed. The example shown relates to the embodiment in which chapters do not have organizers, but may understood to apply, mutatis mutandis, to the embodiment in which chapters do have organizers.

Processing begins at step 200, and it is assumed that this processing takes place at an appropriate server, with suitable connections to the Internet. Of course, other hardware configurations could be used as meets the needs of the particular indications that work that is involved. It is also assumed that the system schedules meetings at a point in time that is in advance of the already-known meeting date. Thus, a database of meeting dates can be periodically consulted, and those meetings requiring automatic scheduling on any given date can easily be determined. The processing after step 200 therefore is described with respect to the scheduling of a given gathering or meeting, or, in other words, with respect to automatically scheduling an in-person gathering for the chapter at one venue of several associated with the locale.

To set up a gathering, the candidate venues for the gathering are selected at step 205. The system has a database of venues for public meetings, including information on opening hours and suitability for various kinds of chapters. The system offers a variety of choices to facilitate the selection of venues for the gatherings. For example, a crowded bar might not be the proper venue for practicing Spanish language, and a bar of any kind might not be acceptable for a meeting of a Bible Study chapter. The system automatically selects or rejects candidate venues for the gathering. In particular, the system evaluates the number of members in the chapter, proximity of the venue, and suitability of the venue for the topic, e.g., outdoor spaces for pets. Some of the suitability criteria can be mathematically calculated (such as the seating capacity of a particular venue compared to the average number of attendees for the meeting). Some of the suitability criteria can easily be implemented using appropriate rules (i.e., no topics involving pets in venues that serve food indoors, or, alternatively, all topics involving pets requiring venues that are outdoors). Other, more subtle criteria can be implemented with specific rules as appropriate. It may thus be said that the scheduling of the in-person gathering includes selecting the venue based on a characteristic of the topic and/or a characteristic of the number of active members in the chapter.

In addition, members may provide inputs to propose candidate venues. Venues may be organized by types. A categorization for venues may include a multi-level hierarchical listing similar to the one described above for topics of interest. For example, a particular coffee house may be categorized as follows: it is under the broad category "public places" and then under the narrower type of "coffee shops".

To propose candidate venues, a member can be provided with a listing of venue categories and the member selects the desired venue candidates for the locale. In addition, a member can simply browse through all venues in his locale. For any venue of interest, the member may view information about the venue. The information may include, but is not limited to, venue ratings made by other members, venue location information, directions to the venue and so on.

Venues are then automatically slotted on the ballot and the members are automatically invited to vote at step 210. Members vote on candidate venues in step 215, by means of any of the many well-known techniques for obtaining votes electronically. When the period for voting ends, the system automatically tallies up the votes at step 220. When too few members voted to select the venue, then the gathering may be canceled at step 225. The voters (the interested members who voted) may be directed to a nearby locale where sufficient number of users expressed interest in a gathering or they can be simply notified that the event is cancelled due to a lack of interest. The members are also free to arrange to meet privately using the message boards. When the analysis in step 220 indicates that enough members voted, the system may optionally wait for additional votes for a predetermined period of time at step 230.

When the optional additional voting period ends, the system tallies up the number of votes for various candidate venues in step 235, informs the members of the winning venue, and invites the members to make a reservation (RSVP) for the gathering. To prevent gatherings growing too large for a given venue, the system can also make a determination to split the gathering between two or more venues, based on a configurable threshold of votes, when more than one venue has received a minimum number of votes. This kind of determination may be performed using a configurable threshold for each venue, allowing the system automatically to split up groups exceeding the configuration. This threshold may vary from topic to topic, and chapter to chapter, depending on the needs of the topic and organizers, if any. The threshold may be thought of as a venue attendance threshold, and this threshold may be based on a characteristic of the topic and, in a led chapter, may be set by the organizer.

For example, for a political campaign topic, a gathering will may be set to occur for any venue on the ballot that receives at least 25 votes. In such a case, the system may automatically notify members that that more than one venue has been chosen, and request that the RSVP be made in such a manner as to indicate a chosen venue (which can be different than the one they voted for). This allows a group in a given locale to split into sub-groups that a) are sized appropriately so that a single venue does not become uncomfortably crowded, and b) allow users to meet at the most convenient venue for them, when a given locale has enough members to support multiple gatherings. To put it another way, when the number of votes from the chapter members planning to attend the gathering exceeds a venue attendance threshold, more than one venue for the gathering is automatically selected and the members are notified.

When the RSVP period ends, the system tallies up the number of members giving an affirmative RSVP (RSVPers) to determine if enough people are coming, at step 240. An affirmative RSVP may be thought of as an indication that a chapter member is planning to attend the in-person gathering, or as an attendance plan indication from the member. When less than a predetermined minimum number of members RSVPed in the affirmative, i.e., not enough members plan to attend the gathering, the gathering may be canceled at step 225. The attendance threshold may be determined on various bases, such as an minimum number of e.g. 5 for all gatherings, or may be determined based on a characteristic of the topic, such as 10 for basketball or 4 for bridge.

When the gathering is canceled, the RSVPers may be notified of the cancellation, for example, by email. In addition, the system may provide these RSVPers with a list of other chapters where sufficient interest for the topic was expressed.

As an alternative to canceling the meeting when the number of RSVPs is below the threshold, a special variant of a pre-event reminder mail may be sent, alerting users that turnout may be small so that they can make extra efforts to confirm attendance using message boards provided by the service.

On the other hand, if enough members RSVPed, the gathering takes place at the elected venue and the members who plan to attend are automatically reminded of the gathering, at step 245. One or more reminders may include the winning venue, directions to the winning venue, time and date for the gathering. Moreover, the reminders may include specific aspects of the particular topic to be discussed and so on. Reminders may be sent to only those who RSVPed, or to all chapter members.

After the gathering takes place, the system polls the RSVPers for quantitative and/or qualitative feedback (which includes any suggestions for the next gathering, suitability of the venue, whether the RSVPer attended the gathering, an estimate of the number of people who attended and so on), at step 250. When the user completes the poll, the system automatically sends a thank you message. An end to the process is shown at step 260 for the sake of a clear explanation, and at this step the system also archives the past gathering. The nature of the periodic gatherings, however, dictates that the process recur, and at a suitable time the processing begins again with step 200 for organizing the next gathering.

The messages mentioned above, including requests for RSVP, reminders, and requests for feedback may include appropriate advertising material, such as coupons for discounts at the selected venue or the like.

In a led chapter, the organizer can allow the system to organize the event, and then the process is as illustrated in FIG. 4. Organizers, however, may manually override a number of the above described steps. Organizers provide additional flexibility in organizing the gathering. As already mentioned, the organizer can add extra venues or replace venues on the system's voting ballot. The organizer can nominate new venues, including private homes. The organizer may simply choose a venue for the gathering, thereby overriding the need to vote. In addition, the organizer may select a different venue for gathering after the system tallies up the number of votes. The organizer can also cancel the gathering when there are too few members or for some other reasons. The organizer may set a threshold number of votes below which the gathering is automatically cancelled due to lack of interest and so on. In addition, the organizer may request the members to pre-vote on candidate venues to narrow the list of candidate venues. Moreover, the organizer may send members warning messages that too few members voted or RSVPed for the event, inviting other members to vote or to make an RSVP.

A determination may be made as to whether a chapter for the topic of interest exists in a locale convenient for the user. Such a determination may be performed in a variety of ways, including a calculation showing whether the chapter is within a predetermined radius such as one hundred miles, or a calculation utilizing latitude/longitude related information. When the chapter for the topic of interest does not exist in a locale convenient for the user, the user may automatically be invited a) to join a chapter for this topic of interest at a distant locale that is closest to the locale of the user, b) start his own chapter as an organizer, c) presented with a list of nearby chapters in related topics, selection of which is automatically calculated based on cross-membership information (e.g., "Members who signed up for Spanish Language chapters also signed up for Spanish Expat chapters") or d) add his name to a waiting list users who want to be informed when other chapters start nearby. The system can automatically detect when a predetermined number of users have indicated interest in a topic within a locale, and automatically determine to start a new chapter, electronically notifying the interested persons of the establishment of the chapter, and automatically schedule a first meeting.

In the illustrative, non-limiting embodiments mentioned above, gatherings are facilitated by allowing internet users all over the world to search for a topic of interest and find a real-world, local group that meets on that topic nearby. In addition, these exemplary systems allow users to form local groups around a common interest, and associate those local interest groups with similar groups around the world.

The present invention is a web-based, user interactive meeting facility for enabling groups of users to interact and organize in-person meetings associated with any topic of user interest to help maintain ongoing local interest groups, such as including topics relating to cooking, books, writing, pets, politics, social activism, small business, professional, education, environmental, science, community, investment, art, crafts, town meetings, sports, games, entertainment, music, religious, travel, personal, and the like. The meeting facility may allow a user to express an interest for a new group in a geographic area, form new groups based on the expressed interest of others, run and organize a group, organize in-person meetings, join an existing group, manage meetings, merge or coordinate with other groups, and the like. In addition, the meeting facility may provide for monetary management of meetings, provide sponsorship for meetings, generate financial benefits though group targeted advertisements, and the like. In embodiments, the web-based interactive meeting facility may provide an improved way for users to connect and meet with other geographically proximate users who share similar interests, as well as providing a way for groups around the world to coordinate activities.

For instance, an individual may have an interest in joining a group as a member, where the group shares an interest with the individual and has meetings within a local area accessible to the individual. The individual may go to a website associated with the meeting facility and search for a group, such as based on an interest topic, on a geographic region, from a list of top interests, and the like. In embodiments, the individual may also come to the meeting facility through an association with other social networking sites or from other individuals, where the individual may receive an invitation from a member of an existing group, from the organizer of a group, from another individual considering becoming a member of a group, through an Internet search, and the like. Social networking sites, such as Facebook and MySpace, may connect users of the social networking site to their meeting group, and vice versa, such as through an API of the social network site or the meeting facility. In embodiments, users may also be introduced to a meeting group through a plurality of on-line communications facilities, such as SMS, Twitter, Yelp, and the like, where the meeting facility may continue to facilitate communications between meeting facility members, and non-members, through these communications facilities and social networking sites. For example, meeting group events may be formed on-line, in a mobile ad-hoc manner, such as through user's texting or 'tweeting' each other, and forming impromptu meetings. In embodiments, the individual may also come to the meeting facility through a search engine, such as provided by the meeting facility or through a third-party search engine (e.g. Google or Yahoo). When the individual views one of the meeting group websites associated with the meeting facility for the first time they may view the site as a non-member. In embodiments, there may be different views of the website available based on whether the individual is a member, a non-member, a group organizer, and the like. In embodiments, the meeting facility may enable international participation, such as through the availability of multiple languages, currency, national restrictions, and the like.

In searching for a meeting group the individual may search by topic, by area, by viewing lists of top interests, by viewing the lists of top cities, and the like. When an individual finds a meeting group that they may be interested in joining, they may be able to view the group's homepage, which may include a description of the meeting group, activities, ongoing discussions, member profiles, photo galleries, fees for the meeting group, and the like. In embodiments, some meeting groups may be private, and their homepage may be viewed by only the organizer, members, or individuals that have been invited to view the site or to become a member by the organizer of the group. In this regard, the meeting group's organizer may have several options, such as to make the meeting group public, make the meeting group accessible by approval only, make the meeting group available to members who have an invitation or invitation code, close the meeting group to new members, and the like.

The non-member coming to the meeting facility website for the first time, without an invitation or the like, may find a public meeting group that they wish to join. In this instance, the non-member may enter, such as from an event page, but may need to join the meeting group before they are allowed to sign up for an event. For example, the individual may not be allowed to RSVP for an event before becoming a member, where RSVP may be one of a plurality of ways a user may indicate their interest in attending a meeting group event. The non-member who wishes to join the meeting group may be required to supply personal information, such as their name, nickname, email address, reason for joining, address, age, photo, caption for their photo, current activity level in other meeting groups, the current activity level within the interests of the group they are joining, and the like. In addition, the non-member applicant may be required to choose a password for access to the meeting group's homepage as a member. In embodiments, once the individual becomes a member, they may have additional access in association with the meeting group's homepage, such as being able to RSVP to events of the groups, participate in discussions associated with the group, provide photos from events, rate events, setup a way to pay meeting group fees associated with events and/or membership, view fee payment history, invite guests, print tickets to an event (e.g., with a map and location for the event, event description, and bar code) and the like. The member may be able to exchange money with the organizer and other members, such as though PayPal, Amazon FPS, and the like. In embodiments, the member may also be provided refund options, a list of payments made, and the like. In addition, the member may be able to provide support to the group's organizer, such as to be approved by the organizer to have access to certain organizer privileges. In embodiments, once the individual is a member they may more fully participate in events, receive emails concerning upcoming events, and the like.

Alternately, an individual searching for a group to participate in may not find a group, such as not finding a group matching the interest of the individual, not finding a group matching the interest of the individual in the individual's local area, not find a group matching the interest of the individual that is accepting new members, and the like. In this case, the meeting facility may provide a way for the individual to express their desire to be part of a group that currently does not exist, such as to fill out a web form to that effect, specify a topic and locale, and the like. In embodiments, the individual may be required to provide certain information associated with their desire to be a part of the new group, such as their name, photo, address, general location, distance radius of interest from a location, a statement expressing what kind of group they want to be a part of, the type or category of the new group, the geographic region for the new group, and the like. In addition, the individual may provide a pledge to the new group should the new group ever form, such as to come to the first meeting, to bring supplies, to pay a fee, to provide transportation, to provide a meeting location, to assist the organizer, and the like. In embodiments, the individual may be able to view other individual's information associated with their desire to also have a new group, such as by location, type or topic of interest, age, number of individuals interested in a given topic, and the like. In embodiment, the individual may express that they may be interested in becoming the organizer of a group, such as when there is a minimum number of individuals in a geographic region that are interested in a certain group topic. In embodiments, the individual may receive communications, such as emails, associated with their expressed desire to be a part a group not yet formed. In embodiments, user interest in a new group may be stored with the meeting facility, such as in a database, and be made available to users that may potentially want to become organizers of a new group. In this way, the meeting facility may be able to provide the potential user with the level of user interest to help the potential organizer to decide, what pledges are available, provide automatic services to form the group once the individual makes the decision to form the new group (such as sending out bulk emails to users that recorded an interest, setting up the web page, setting a date for the start of the new group, setting up an account in an integrated financial management facility associated with the meeting facility, providing sponsorship), and the like.

For example, the individual may be interested in becoming an organizer and forming a biking group in the vicinity of the New Jersey shore area, and they note that there are six other individuals near the shore that are also interested in being a part of a biking group. In addition, some of these individuals may have declared pledges for the first meeting of the group. The individual may then decide to start up the new group in association with the meeting facility. In embodiments, the individual may start the new group in association with the meeting facility, where the meeting facility helps the organizer set up the new group, such as by providing a homepage for the group, giving startup advice for starting a new group, providing a help-checklist for starting the group, providing an email announcement for the new group to the other individuals that expressed a desire to be a part of the new group, provide an announcement in association with the website of the meeting facility for all members and non-members to view, and the like.

In embodiments, in creating the new meeting group, the organizer may be able to create tags that will associate the group with the topics, interests, locale, and the like, of the new group. In this way, the group may then be identified through the tags to other groups, members in other groups, users looking for a group, external group and applications (e.g. social networking groups, news groups, city pages, regional events websites), and the like. In embodiments, the use of tags may lead to the formation of new groups, such as through a tagging facility for group organization and visualization, where tags may be used for matching users with similar interests, visualizing (such as through a mapping tool) the location of groups tagged with a given interest, visualizing groups indicated with a predetermined tag for the purpose of organizing events. For example, a tag may be created to correspond to a national grass-roots event, such as the anniversary of the Boston Tea Party, and groups that choose to have a tea party event may temporarily tag their meeting group to indicate that their meeting group is participating with a tea party event, and where the organizer's meeting group may now show up on a visualization map of all groups with that tag. In this way, other users, meeting groups, outside groups, may be able to see all the locations where meeting groups are holding an event. In embodiments, tags may be a way for meeting groups to be identified to the users and applications across the Internet, where tags may change as the interests of the group change, where interests of the group temporarily align with interests outside the group, where the group would like to get its members involved in a new interest direction, and the like.

In embodiments, the individual wishing to become an organizer of a new group may need to be approved by the meeting facility, such as to provide information associated with the new group, to provide personal information, to provide financial information for group management fees, to provide sponsorship information, location of the new group, reason for wanting to start the new group, and the like. The individual that starts a new group may be referred to as the group's organizer.

In embodiments, an organizer may be provided additional privileges, control, and/or facilities in association with running the group, such as a group homepage, fee options, control of wiki shared access with members or co-organizers, member listing, attendance control, last member contact information and email lists, member restrictions (e.g., public, private, restricted, and the like), creating a new meeting, facility for selecting a venue for a meeting, provide payment options, provide international access, capability to be associated with other groups in a collaborative manner, accept sponsorship to the group through advertisements on the web page, accept sponsorship by an organization to pay group fees, provided with access to a financial management facility for managing the financial matters associated with the group, and the like. The group's homepage may include a plurality of components, such as a group description, member information, discussions, calendar of events, links to products and group materials, a photo-board for events, ratings for events, attendance, hyperlinks to associated web pages, feeds, jobs, blogs, and the like. The components available to the organizer's homepage may be flexible in their selection and placement, such as in the use of meeting facility specific gadgets or third-party gadgets (e.g. Google gadgets). The organizer may also be provided with payment management resources, meeting management facilities, attendance control, fees control, and the like. In embodiments, the organizer may choose to share their organizer privileges with members of the group, such as though wiki aspects associated with the homepage.

Once the organizer has set up the new group, they may create a meeting event, such as selecting a date, time, venue, fees, payment options, sending out emails, listing the event on the group homepage, and the like. For instance, in a first meeting of the group the organizer may utilize any pledges that other individuals may have previously offered, specify fees associated with the group and/or meetings, specify needs for the meeting, specify any desire for shared responsibility for the group and/or the meeting, and the like. In embodiments, the meeting facility may provide for a plurality of homepage related functions to the organizer to make meeting creation and management easier and more efficient. For example, in creating a new meeting the organizer may be provided drop-down menus or the like for location of the meeting, such as a new venue, chosen from a list of past group venues for the group, chosen from a list of past group venues for all groups, and the like.

In embodiments, the organizer may provide information associated with the venue, such as location information, whether the venue is in a private or shared setting, a rating for the venue as provided from the group's past experience or from all group's past experience, a detail page with address and organizer specific descriptions or tags, a map such as through an annotated graphical user interface associated with the meeting facility, and the like. The organizer may select a venue based on these parameters, as well as being able to search for a venue based on location, street address, near a point of interest, near another venue, and sort by distance, alphabetical, popularity, and the like. The organizer may also examine reviews of venues from other groups, and filter the choices based on member and/or group attributes, view upcoming events at the venue, obtain additional information about the venue, such as whether the venue has parking, is kid friendly, and the like. The organizer may have access to a venue map facility as part of the meeting facility, where, for instance, the organizer may be able to bring up a map of an area, and where venues are indicated as the organizer moves across the map, and provided with all the available venue information by clicking on the indication (e.g. a pin or bubble, with an annotation of the venue's name, label, tag, and the like). The organizer may be able to choose between the meeting being public, private, limited member participation, by invitation only, and the like. The organizer may set RSVP settings and deadlines in association with a meeting, such as in connection with payment of fees for the meeting. The organizer may be able to contact members, such as based on their meeting activity, and set criteria for sorting and selection of members to be emailed, such as by the last time the member attended a meeting event.

The meeting of a group may entail a plurality of activities associated with the particular interests of the group, as well as activities that are associated with the management of the meeting, such as taking attendance, taking photos for the homepage, and the like. Post-meeting activities may include updating the homepage, scheduling new meetings/events, adding photos to the homepage, recording attendance, managing fees, posting received event ratings, and the like. In embodiments, some post-meeting activities may be organizer controlled, group controlled, co-organizer controlled, controlled by the meeting facility, and the like, as may be determined by the organizer.

In embodiments, the meeting facility may provide for a way for meeting groups to interact and associate with other groups, such as to form an alliance of groups. The purpose of the alliance may be to increase the access of membership to a larger geographic region, to help in achieving the goals of the groups, to combine forces for a movement, to allow groups to grow beyond their original geographic limits, and the like. In embodiments, the control and management of an alliance of groups may include many of the same meeting facility functions described herein (e.g., homepage, discussions, venue selection, membership, joining options, approval process, activity, wiki co-organizer functions, and the like), where rather than there being a group organizer, there is an alliance organizer. For instance, there would be group membership and group joining rather than individual membership and individual joining, and the like. Further, the alliance organizer may also be determined in a similar way, where they may be selected based on a first group organizer expressing an interest in forming an alliance, a first group organizer from a list of group organizers (that have expressed an interest in forming an alliance) expressing an interest in forming an alliance, and the like. Again, similar to groups, alliances may also be searched on and viewed, but in addition, due to the potentially national or global distribution of groups included in an alliance, a mapping facility may be provided to show the groups participating in the alliance. Groups may then search for alliances to join, and alternately, alliances may search for groups to invite into the alliance.

In embodiments, both groups and alliances may be required to pay management fees in association with the meeting facility. These fees may be required from the organizer of the group or alliance, or the fees may be paid by some sponsoring organization, such as an educational organization, governmental organization, company, and the like. For instance, a high school may sponsor a club site in association with the meeting facility, where the school rather than the organizer (e.g., a teacher or student) pays certain fees, such as a monthly maintenance fee. In another example, local political groups may be sponsored into a national alliance by a political organization, where the political organization pays certain fees.

In embodiments, advertisements may be utilized in association with groups or alliances, such as the placement of advertisements on their homepage, in discussion forums, communications, and the like. Advertisements may be coordinated, provided, or offered to groups and alliances through the meeting facility. Groups and alliances may choose to accept or to opt-out of advertisements, such as declining an offer supplied in an email, clicking on a decline button associated with the advertisement as placed on the homepage, specifying that the group and/or alliance is or is not interested in all advertisements, and the like. In embodiments, sponsored advertisements may help defer the costs of management fees, the cost of meeting events, provide products to members of the group, provide benefits to members of the group, and the like. In embodiments, groups and alliances may choose to opt-out of advertisements at any time. In embodiments, sponsorship may be provided to the organizer through the meeting facility, obtained by the organizer, be related to meeting groups using a venue associated with the sponsor, and the like.

In embodiments, the meeting facility functionality, such as non-member searching and viewing, member group and alliance participation, organizer management resources, financial management facility, and the like, may be accessed through a plurality of computer related facilities, such as a personal computer, a mobile computing device, a mobile phone, a cell phone, a navigation device, a PDA, a game, a mobile game device, through the internet, through a local area network, through a browser, through email, through instant messenger, through text messenger, and the like. In embodiments, the meeting facility may provide for social networking, group social networking, a governmental and/or community meeting resource, for social activism, governmental activism, environmental activism, a political organizational resource, an entertainment venue resource, international networking, personal networking, an enterprise meeting tool, an educational meeting resource, an entrepreneurial group resource, an professional group resource, and the like. In embodiments, the meeting facility may be incorporated into third party applications, such as other social networking sites, news groups, city events calendars, mobile device applications (e.g. i-phone applications, blackberry applications, and the like), third-party websites, search engines, and the like.

In embodiments the meeting facility may provide a financial management facility to the organizer for managing the financial aspects of the meeting group, including financial accounting, member payments, sponsor payments, refunds, batch refunds, dues, payments to vendors, payments for venues, payments for group activities, organizer payments to the meeting facility, and the like. In embodiments, the financial management facility may enable the organizer to export and/or import from third-party financial management applications, such as Quicken, Microsoft Money, Moneydance, FirstOffice, Lawson Software, SAP Business One, and the like. In embodiments, the financial management facility may enable the organizer to export and/or import from third-party spreadsheet applications, such as Microsoft Excel, Microsoft Works, Lotus 1-2-3, Appleworks, Wordperfect Quattro Pro, Google spreadsheets, Openoffice, and the like. In embodiments, the present invention may provide organizers and members with accounting utilities that ease the financial burdens associated with organizing in-person meetings amongst a disparate group of individuals, including facilities that provide a transparent accounting for users not accustomed to accounting software, more sophisticated accounting options for those individuals accustomed to third-party applications, charts and graphs to show status of payments, reminders and checklists, and the like.

Figure 5:
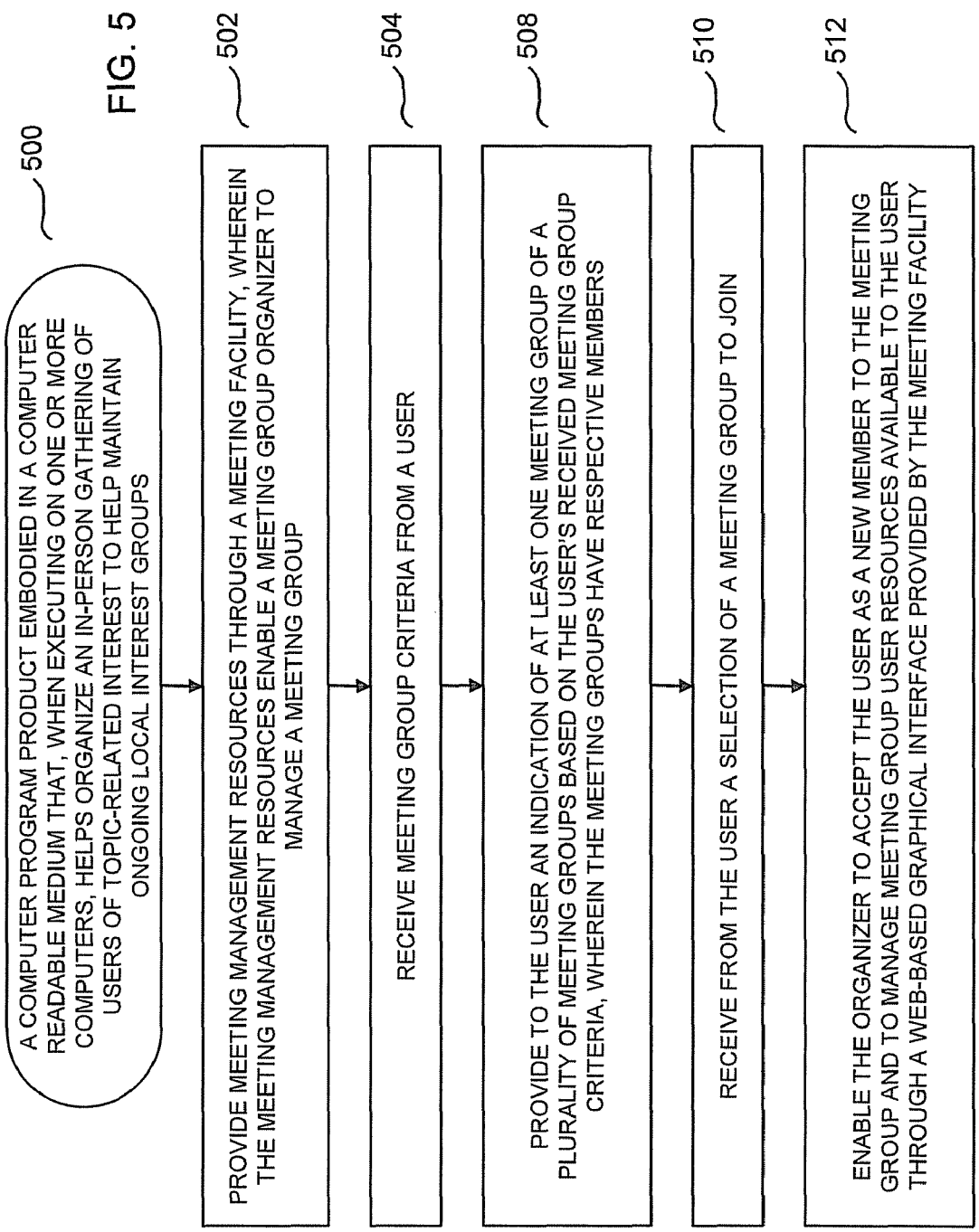
FIG. 5 shows a flow diagram showing how an organizer-based meeting facility may be implemented in an embodiment of the present invention.

Referring to FIG. 5, in embodiments the present invention may provide for an organizer-based meeting facility. For instance, a new user may locate a meeting group website managed by an organizer through meeting management facilities provided by a meeting facility, where the user may locate the meeting group website by entering meeting group criteria into a search interface (such as entering a zip code and/or topic into the search interface), entering general information related to an interest into the search interface, and the like, where the user may utilize intermediate search results, subsequent questions, and the like, to help locate the meeting group website. The user may then be provided information about the meeting group through the meeting group website, and be provided an opportunity to join the meeting group, wherein the organizer may have the ability to determine what information is available/visible to the user, and whether the user is allowed to join (such as through questions provided to the user through a joining interface provided through the website). After being allowed to join, the user may be provided meeting group resources managed by the organizer through meeting management facilities provided by the meeting facility, where the meeting group may be made up of the organizer and a plurality of users. Alternately, a user may not find a meeting group they want to join, where the meeting facility provides that user with a way to specify criteria for a meeting group they would like to be a part of, such as though an alert list, waiting list, and the like. That is, a user may utilize the meeting facility to help find a group in the future that matches their interests and locale. In turn, the meeting facility may use the interests provided by a plurality of such users to help form new meeting groups, such as through an organizer that is looking to form a new meeting group with a specified set of criteria. For example, a number of users may be looking for a hiking group near Albany N.Y., and seeing that there is currently no such group, may sign up with the meeting facility to be alerted when such a group forms. The user may also specify other interests, locations, and the like, for other meeting groups that currently don't exist. Continuing with the example, the meeting facility may provide a user with access to what interests currently exist for groups not yet formed, for instance, for a hiking group near Albany N.Y. In this case, the user may be provided with the interest level, such as how many users are on the alert list for hiking groups near Albany N.Y., and upon seeing such interest, may utilize the meeting facility to form a new meeting group, as described herein. In this way, an individual may be a user of the meeting facility without being a member of a meeting group.

In embodiments, a computer program product embodied in a computer readable medium that, when executing on one or more computers, may help organize an in-person gathering of users of topic-related interest to help maintain ongoing local interest groups 500 by performing the steps of: at a step one 502 providing meeting management resources through a meeting facility, wherein the meeting management resources may enable a meeting group organizer to manage a meeting group; at a step two 504 receiving meeting group criteria from a user; at a step three 508 providing to the user an indication of at least one meeting group of a plurality of meeting groups based on the user's received meeting group criteria, wherein the meeting groups have respective members; at a group four 510 receiving from the user a selection of a meeting group to join; and at a step five 512 enabling the organizer to accept the user as a new member to the meeting group and to manage meeting group user resources available to the user through a web-based graphical interface provided by the meeting facility. In embodiments, the received meeting group criteria may be input through a search interface, where the search interface may be provided through the meeting facility, through a third-party, a search engine, and the like. In embodiments, the meeting group criteria may include a geographic locale of the user, where the geographic locale may be provided by a zip code input by the user, determined through a computing facility (e.g. a mobile computing device, service provider) being utilized by the user, and the like. In embodiments, the meeting group criteria may include a topic, where the topic may be input by the user, selected by the user from a predetermined list of topics, selected by the user from a list provided by the search interface, and the like. In embodiments, at least one of the meeting management resources may be a calendar of meetings, where the calendar of meetings may specify a location for a meeting, a date and time for a meeting, and the like. The user may select to join one of a plurality of meetings included in the calendar of meetings, where joining may be through an RSVP facility, and the like. In embodiments, at least one of the meeting management resources may be access to at least one of the respective members of the meeting group the user joined, where access may be through email, instant messaging, to the organizer, and the like. In embodiments, the organizer may be able to share access to meeting management resources with select members of the meeting group. In embodiments, a meeting group may be referred to as a chapter. In embodiments, a user may find a group by searching, browsing, and the like. Meetup groups may have one or more topics, tags, and the like (where the words topics and tags are used interchangeably) associated with it. The tag may be pre-existing, or created by a user if the tag does not yet exist, such as in a database of the meeting facility. Once created, this new tag may be used by additional, new, or existing users.

In embodiments, a computer program product embodied in a computer readable medium that, when executing on one or more computers, may help organize an in-person gathering of users of topic-related interest to help maintain ongoing local interest groups by performing the steps of: providing a web-based meeting facility to a plurality of users, where each of the plurality of users choose to join at least one of a plurality of meeting groups based on topic-related interest and geographic locale; enabling at least one user-organizer to maintain control of organizing meetings with the at least one of the plurality of meeting groups, wherein the one of the plurality of meeting groups is made up of a subset of the plurality of users; and providing organizational facilities to the user-organizer through the web-based meeting facility for creating and facilitating activities of the at least one of the plurality of meeting groups, where one of the organizational facilities may be scheduling meetings. In embodiments, a user may 'join' the meeting facility simply by entering their email address and creating a password, and may not be required to join a group. They may simply select an interest (or no interests) and select to be notified when a group about any interest that they have selected starts near them. In embodiments, it may be possible for a meeting group to exist in a leaderless state, such as if an organizer steps down and removes themselves from that position. For instance, the group may remain leaderless for a period of a couple of weeks while a new leader emerges and steps up. In embodiments, if no new organizer steps up, the group may be disbanded.

Figure 6:
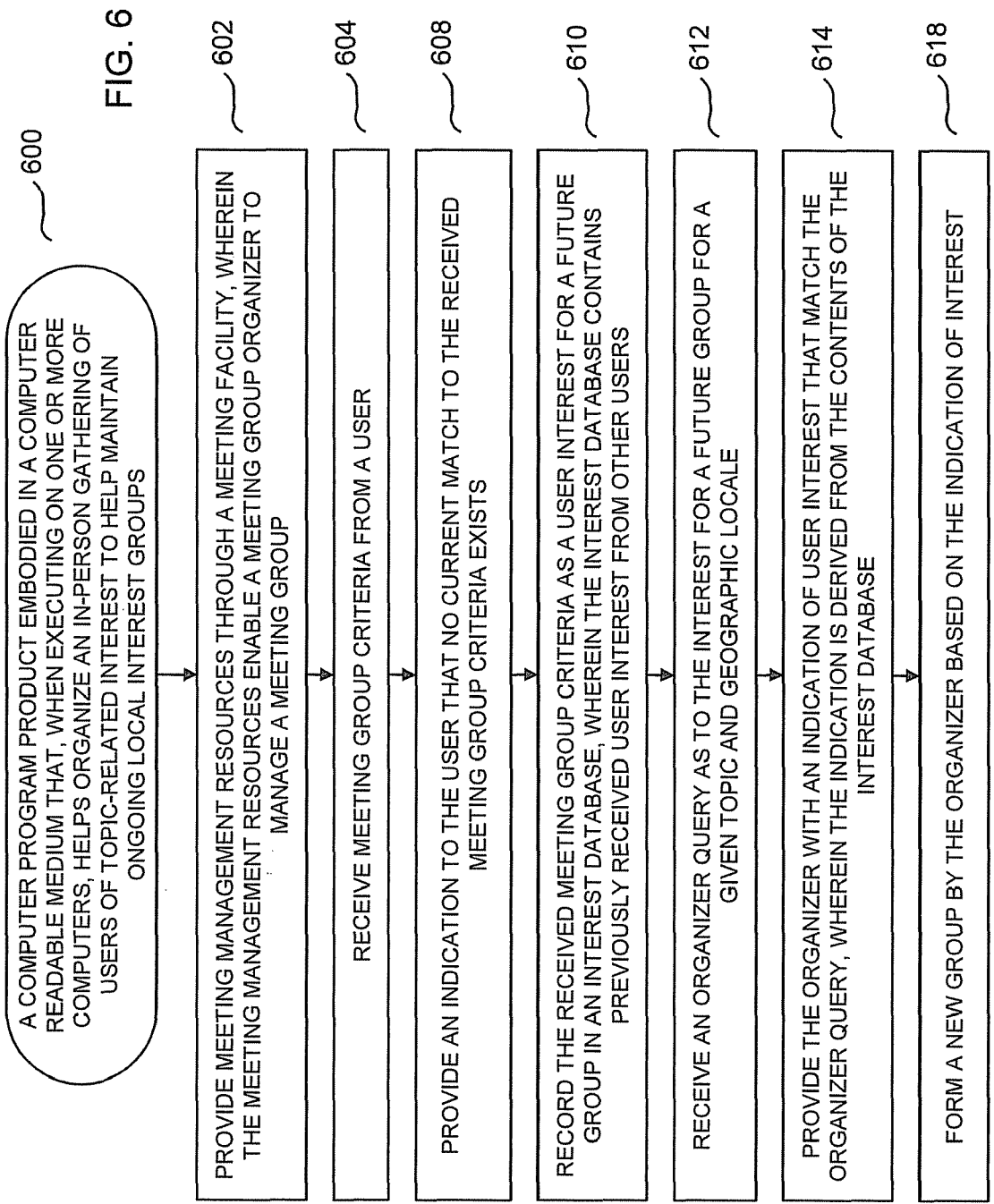
FIG. 6 shows a flow diagram showing how meeting groups may be formed through user generated interest in an embodiment of the present invention.

Referring to FIG. 6, in embodiments the present invention may provide for meeting group formation though user generated interest. For instance, a potential organizer may monitor interest presented by users in at least one of a topic and locale and decide to initiate the formation of a new meeting group using the resources of the meeting facility. In embodiments, a computer program product embodied in a computer readable medium that, when executing on one or more computers, may help organize an in-person gathering of users of topic-related interest to help maintain ongoing local interest groups 600 by performing the steps of: at a step one 602 providing meeting management resources through a meeting facility, where the meeting management resources may enable a meeting group organizer to manage a meeting group; at a step two 604 receiving meeting group criteria from a user; at a step three 608 providing an indication to the user that no current match to the received meeting group criteria exists; at a step four 610 recording the received meeting group criteria as a user interest for a future group in an interest database, where the interest database may contain previously received user interest from other users; at a step five 612 receiving an organizer query as to the interest for a future group for a given topic and geographic locale; at a step six 614 providing the organizer with an indication of user interest that match the organizer query, where the indication may be derived from the contents of the interest database; and at a step seven 618 forming a new group by the organizer based on the indication of interest. In embodiments the forming of the new group may be automatically formed once the organizer chooses to form the new group based on the indication of user interest, where the automatic formation may include emails to users with recorded interest matching the organizer query, meeting management resources made accessible to the organizer, and the like. In embodiments, meeting group criteria may exist, but the user may ignore that group and choose to sign up for an alert list anyway. In embodiments, an organizer may have to pay and provide information to the meeting facility before the group is formed, and in this way the group may not be formed in a completely automatic way. In embodiments, the meeting facility may provide time to a new organizer to set the meeting group up before emailing those in the local area who have signed up to be notified when a relevant meetup group starts near them, such as based on their pre-selected topics. In embodiments, users signed up through an alert list may be notified of the formation of a new meeting group and choose to join, choose to not join, choose to remain on the alert list until another meeting group is formed, and the like. In embodiments, if an existing meeting group is disbanded, the members of that group may be placed back on an alert list for the topics that were assigned to the meeting group that they had been a member of. In such a case, when a new group is formed matching their topics or tags, they may be re-alerted through the process of the alert list as described herein. In embodiments, users that are on an alert list may also receive regularly scheduled targeted system email newsletters highlighting meeting groups and group events relevant to their interests (i.e. topics or tags) that they may have missed.

In embodiments, the present invention may provide for a computer-implemented method of receiving an indication of interest from a user in participating in a meeting group, where the indication of interest may be indicative of a user preference for a type of meeting group; accumulating indications of interest for a plurality of users; and upon accumulation of sufficient interest in a type of meeting group, facilitating communication to users that have indicated interest in that group suggesting the forming of a meeting group.

Figure 7:
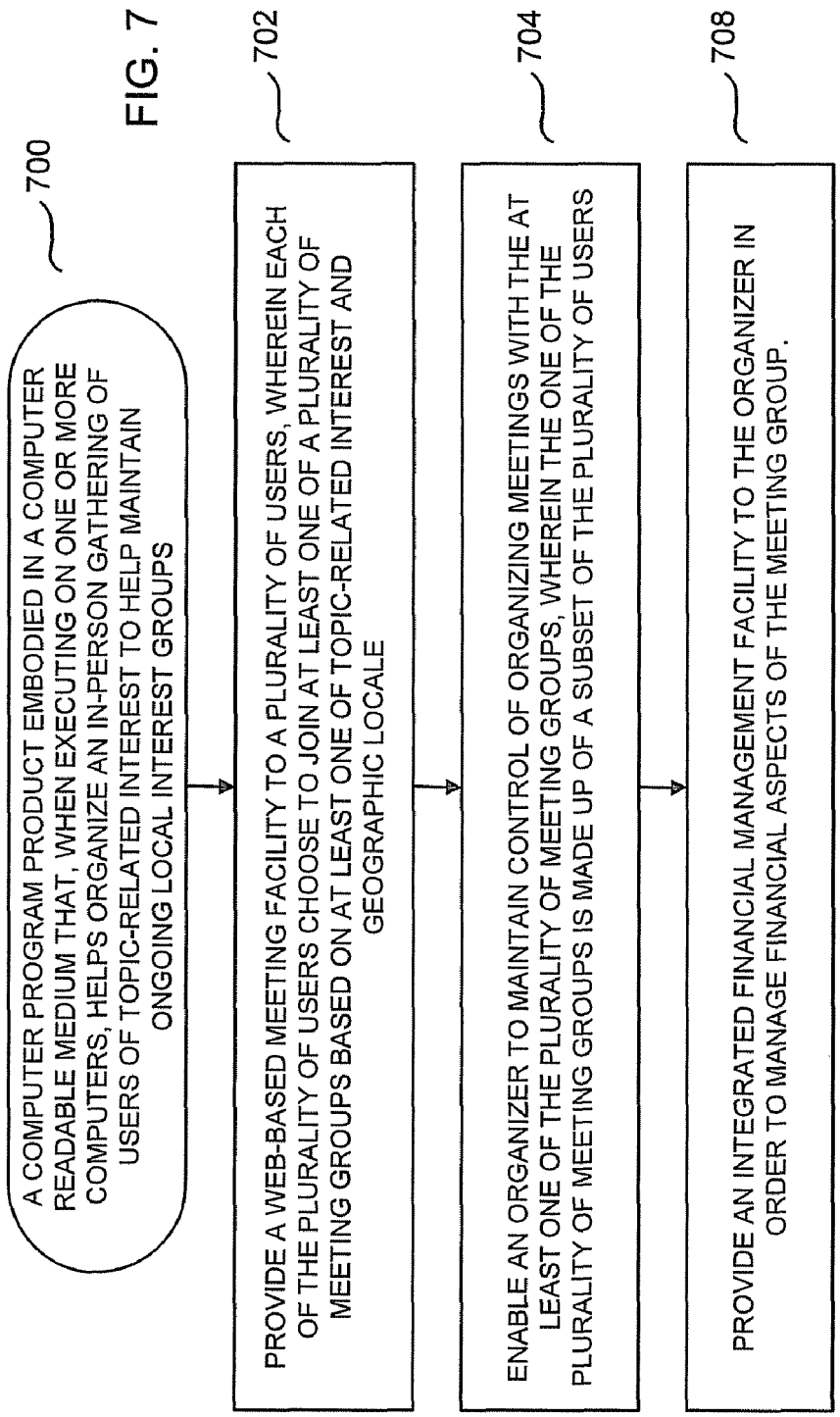
FIG. 7 shows a flow diagram showing how the meeting facility may include a integrated financial management in an embodiment of the present invention.

Referring to FIG. 7, in embodiments the present invention may provide for a meeting facility with integrated financial management, where an organizer may be able to manage the financial obligations of at least one of the meeting group and individual meetings, through an integrated financial management system provided by the meeting facility. In embodiments, a computer program product embodied in a computer readable medium that, when executing on one or more computers, may help organize an in-person gathering of users of topic-related interest to help maintain ongoing local interest groups 700 by performing the steps of: in a step one 702 providing a web-based meeting facility to a plurality of users, where each of the plurality of users may choose to join at least one of a plurality of meeting groups based on at least one of topic-related interest and geographic locale; in a step two 704 enabling an organizer to maintain control of organizing meetings with the at least one of the plurality of meeting groups, where the one of the plurality of meeting groups may be made up of a subset of the plurality of users; and in a step three 708 providing an integrated financial management facility to the organizer in order to manage financial aspects of the meeting group. In embodiments, the integrated financial management facility provides an integrated centralized accounting facility for the finances of the meeting group. In embodiments, the financial aspect may be a financial obligation by a user, a payment to the organizer (e.g. the payment is from a user, from a user for payment of dues), from the meeting facility, a refund, a batch refund to users, for an event expense, for expenses associated with the running of the meeting group, and the like. In embodiments, the integrated financial management facility may utilize financial resources provided from a third-party application, such as a financial enterprise application (e.g. Amazon, PayPal), a financial management application (e.g. Quicken), a spreadsheet application (e.g. Microsoft Excel), and the like. In embodiments, a user may 'join' the meeting facility simply by entering their email address and creating a password, and may not be required to join a group. They may simply select an interest (or no interests) and select to be notified when a group about any interest that they have selected starts near them. In embodiments, the financial aspect may be a payment from the member to the organizer, for dues, for fees for specific events, and the like. All of these payments may be transacted either offline in cash (and simply recorded in the financial management facility) or transacted online, such as via PayPal or Amazon payments, who are third party systems that integrate in varying degrees with the meeting facility functionality. In embodiments, once a member has paid the organizer, that member may get a refund, such as initiated by the organizer (e.g. via a financial payment facility such as Amazon payments or PayPal). If the payments have been received for an event where the organizer is using a financial payment facility, the organizer may initiate a batch refund of all payments related to that event. In embodiments, there financial scenarios of payments between members and organizers may not necessitate the meeting facility being involved in the transaction, but merely provides the software facilitation. In embodiments, group revenue generated through sponsorships generated by the meeting facility may also be included in the financial management tools and integrated with the financial payment facility.

Figure 8:
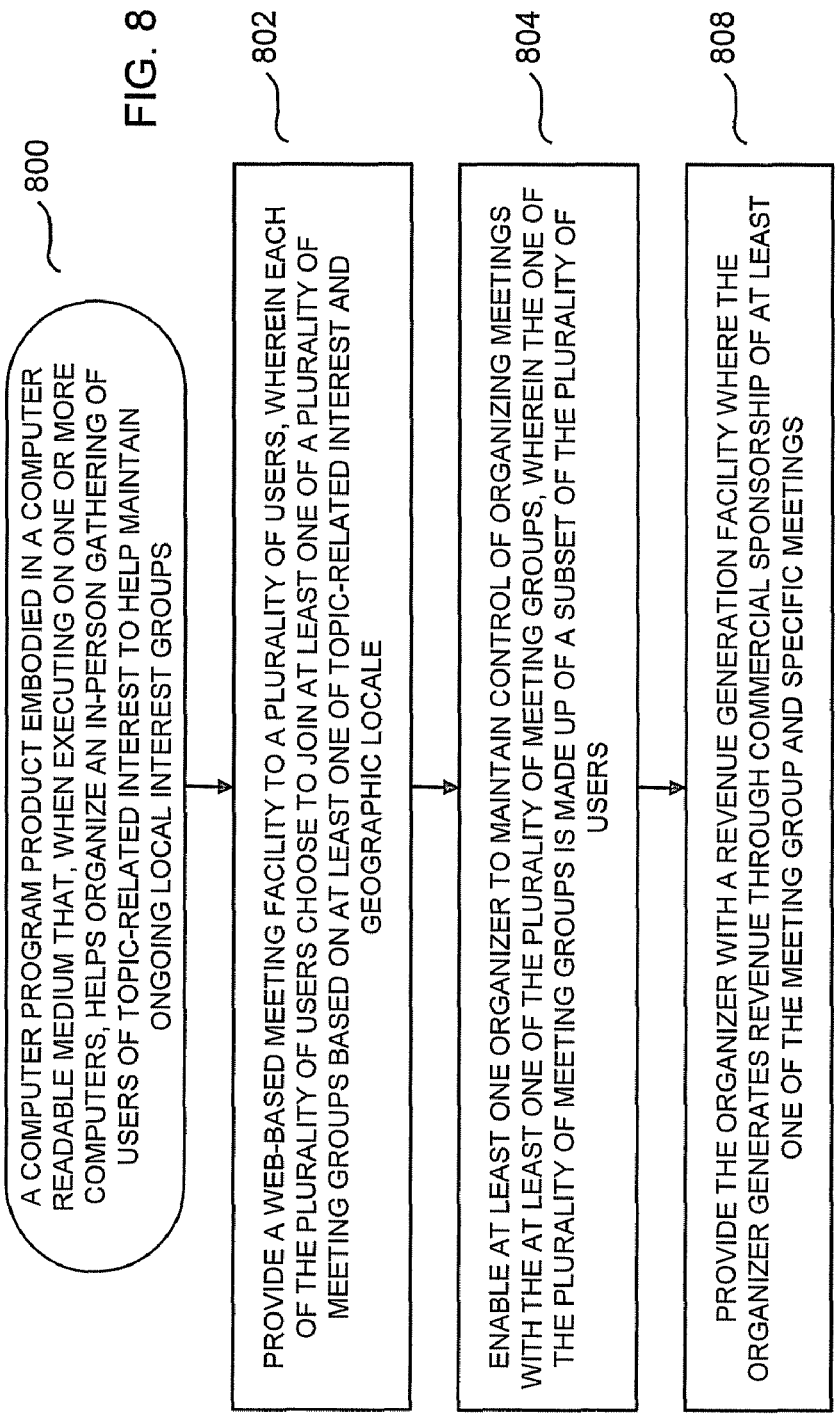
FIG. 8 shows a flow diagram showing how revenue may be generated through sponsorship in an embodiment of the present invention.

Referring to FIG. 8, in embodiments the present invention may provide revenue generation though sponsorship, where a user may create a meeting group and generate revenue through commercial sponsorship of the meeting facility site and/or specific meetings. In embodiments, a computer program product embodied in a computer readable medium that, when executing on one or more computers, helps organize an in-person gathering of users of topic-related interest to help maintain ongoing local interest groups 800 by performing the steps of: in a a step one 802 providing a web-based meeting facility to a plurality of users, where each of the plurality of users may choose to join at least one of a plurality of meeting groups based on at least one of topic-related interest and geographic locale; in a step two 804 enabling at least one organizer to maintain control of organizing meetings with the at least one of the plurality of meeting groups, where the one of the plurality of meeting groups may be made up of a subset of the plurality of users; and in a step three 808 providing the organizer with a revenue generation facility where the organizer may generate revenue through commercial sponsorship of at least one of the meeting group and specific meetings. In embodiments, the commercial sponsorship may be provided by a sponsor through the meeting facility, by the organizer, and the like. The commercial sponsorship may include an advertisement placed on a meeting group website provided through the meeting facility. The commercial sponsorship may be the sponsor providing revenue to at least one of the organizer and the meeting facility for use of the sponsor's venue. In embodiments, a sponsor which has been recruited by the meeting facility may have their ad placed on a meeting group if the sponsor selects that group to be sponsored, and the group accepts the sponsorship, where this may be referred to as an opt-in sponsorship. in this situation, the sponsor may provide revenue to the meeting group via the meeting facility, utilizing the financial management tools described herein, and a third party financial payment facility (e.g. Amazon and PayPal). In embodiments, a sponsor which has been recruited by the organizer may have their ad placed on a meeting group by working out the arrangement directly with the organizer, and where the meeting facility may not handle the placement of the ad created on the group website or compensation to the group by the sponsor. The organizer may however record receipt of revenue from the sponsor in the financial management tools manually. In embodiments, the organizer may reorder the placement of the ad units for sponsors that they recruit on their webpage, and hide ad units of their sponsors which they do not want to display. Ad units which are sourced by meeting facility may not be moved or hidden by organizers, but may be removed at any time, which may end their participation in the sponsorship and payments from sponsor to organizer (made via the meeting facility) will cease.

Now that the overall system has been described, we turn towards a set of web-based embodiments of the present invention. It should be understood that the following embodiments are meant to be illustrative of how the present invention may be implemented, such as implemented through an Internet website hosted on server and made available to users across the internet on computing facilities as described herein, and are not meant to be limiting in any way.

In embodiments, the present invention may include a register or sign in page, where the page may have links to public pages on the site; the Organizer Center, the main Discuss Meetup.com Message Boards, the Home page, and the like. The page may have a plurality of tabs, such as meetings by topic, meetings by city, start a meeting, 'what's a meeting', and the like. The page may have a register or sign-in prompt. Features and functionality may include a register for a new meeting account or sign in. Also included may be a 'forgot your password' prompt, to request verification link to reset a password. In addition, a user may sign in using a secure server option.

In embodiments, the present invention may include a member account page, detailing a view of information requested during an account creation process. Included may be account information, personal and payment information, personal information, name, user ID, email address, password, location, birthday, Skype name, and the like. In addition there may be features and functionality associated with what a member may change and how a member may toggle between a personal and payment information tab, and a membership and communications tab, and the like. Meeting group memberships may be listed in alphabetical order with mailing list options. The page may itemize other communication options, including meetings in the Making (list profiles and messages), message boards (updates), general preferences (member to member email and greetings), email from the meeting facility options, a global unsubscribe option, and the like. From this page, a member may leave a meeting group, adjust their mailing list settings, add or edit a profile photo, cancel message board subscriptions, edit a meetings in the making profile, picture and settings, subscribe or unsubscribe to email from meetings, unsubscribe from the meeting facility service, and the like.

Figure 9:
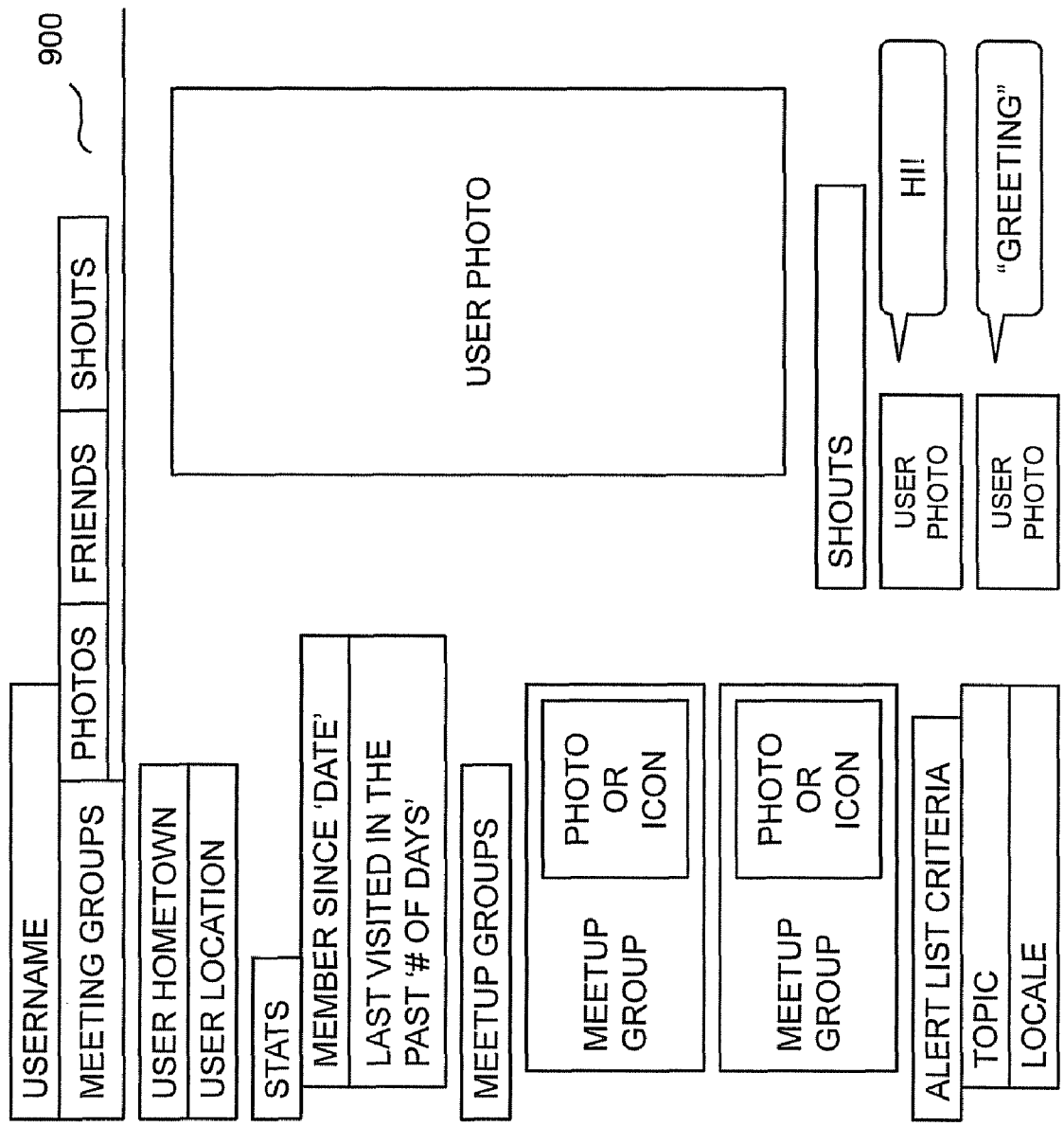
FIG. 9 depicts an embodiment of a main profile page.

FIG. 9 depicts an embodiment of a main profile page 900, showing a number of tabs including the main profile page, meetings, photos, friends and greetings, and the like. The header may include personal information, such as member's user name, and basic membership content (e.g. hometown, location, statistics, meeting memberships, and the like.) In addition, features and functionality may include how a member may privatize selected information, including meeting group memberships and meetings in making list subscriptions, change links, statistics, editing greetings, and the like. A photos tab may display photos uploaded to the site by a member. In embodiments, a member may choose to show or hide photos, manage photos, and the like. A friends tab may be included, such as showing both mutual and members who have added the user as a friend, including popular topics among friends in a list format, and the like. A member may post a greeting to a friend's profile, remove a friend, block a friend from linking to their profile, and the like. A greetings page may be included, where greetings may be shown next to each member profile who posted the text. A member may be able to send a greeting back by clicking on the link associated with the greeting, delete a greeting, save a greeting, and the like.

In embodiments, the present invention may include a meeting-by-topic page, where a member may search for a meeting by topic, such under categories, popular topics, growing topics, using the topic search box, and the like. In embodiments, clicking on a category may bring you to a category page, with a list of category-specific topics, clicking on the popular topics or growing topics sections may bring you to a topic page, where you may search for a meeting by area, zip code, and the like.

Figure 10:
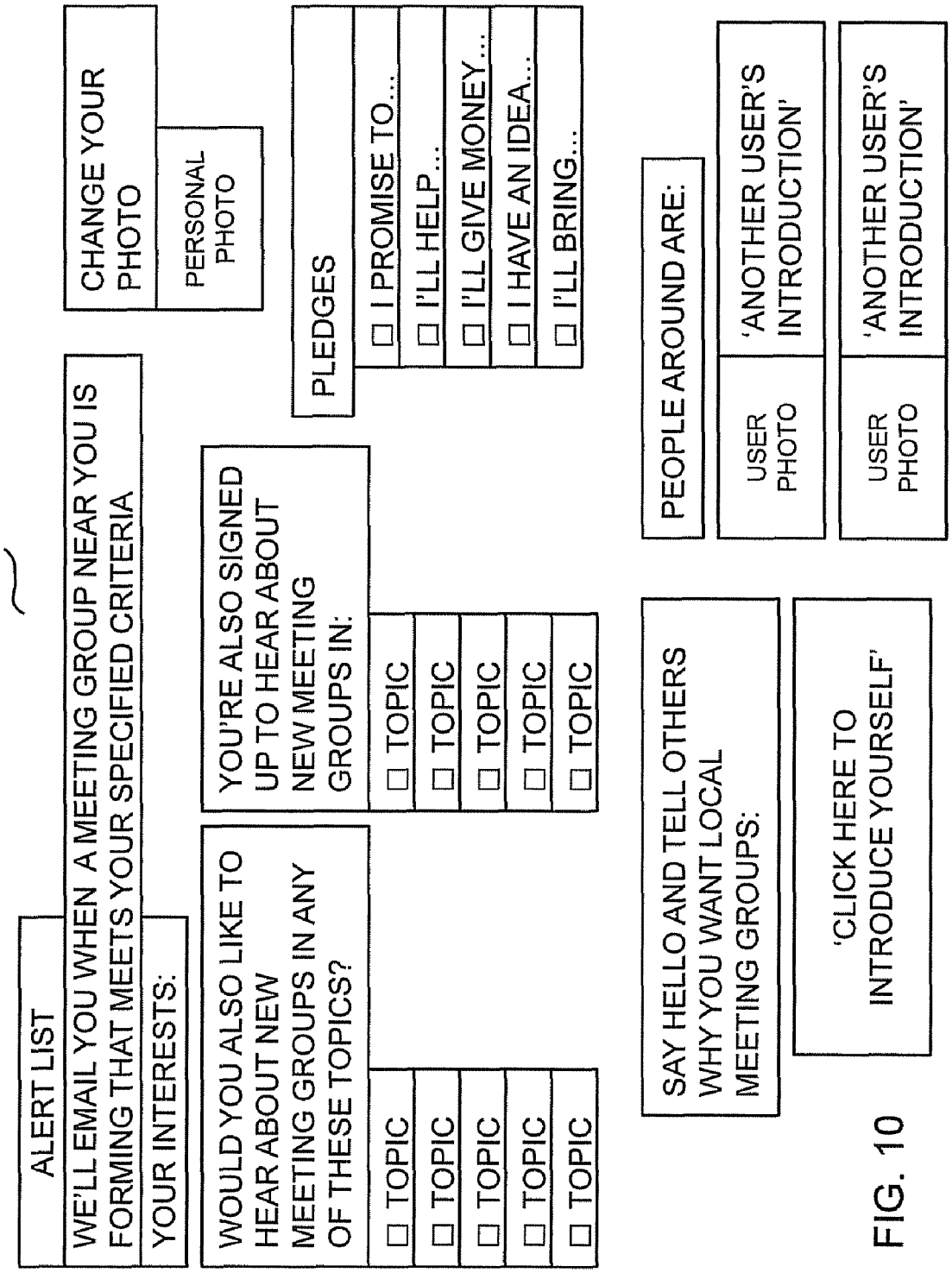
FIG. 10 depicts an embodiment of an alert list process page.

FIG. 10 depicts an embodiment of an alert list process page 1000. When there are no Meeting Groups in a given topic and locale, members may be directed to the alert list sign up page, which may be alternately referred to has a waiting list, a meeting in the making list, and the like. The alert list may include a plurality of users who have registered with the meeting facility, but for which there is no current match. In this way, a user may be included as a user of the meeting facility but not be a member of any group, that is, they may be users of the meeting facility in that the meeting facility provides a vehicle for the user to be alerted to groups that match the criteria they provide to the meeting facility that specifies the types of meeting groups they would like to be involved with. In embodiments, the topic home page may include links to worldwide topic relevant pages on the site; 'Welcome' page (topic home), Worldwide (topic specific) Message Boards, and the like. A member may add interests, add introduction copy, add or change profile photo, add pledges, and the like.

In embodiments, the present invention may include a city page, which may allow a member to sign up for a weekly city email newsletter, or view popular topics, newest meetings in the area, and the like. In embodiments, a member may be able to add an RSS subscription for a feed of all new meetings, receive weekly calendar of upcoming meetings via email, select a popular topic, subscribe to different formats, such as Atom, iCal, Outlook, and the like.

In embodiments, the present invention may include a meeting home page, which may link public pages, an organizer center, a discussion message board, home page, and the like. The page may include a plurality of tabs, including meetings by topic, meetings by city, start a meeting group, and the like. There may be a way for an individual to introduce themselves to the meeting facility community, such as with a photo and a caption. The individual may also be able to subscribe to a free weekly newsletter for local meetings, be provided with a list of other meeting groups that the individual might like, and the like.

In embodiments, the present invention may include a meeting group sign up page, where the individual may sign-up, where an individual may submit a profile to join a meeting group, create a meeting account, submit a profile to join a meeting group, and the like.

Figure 11:
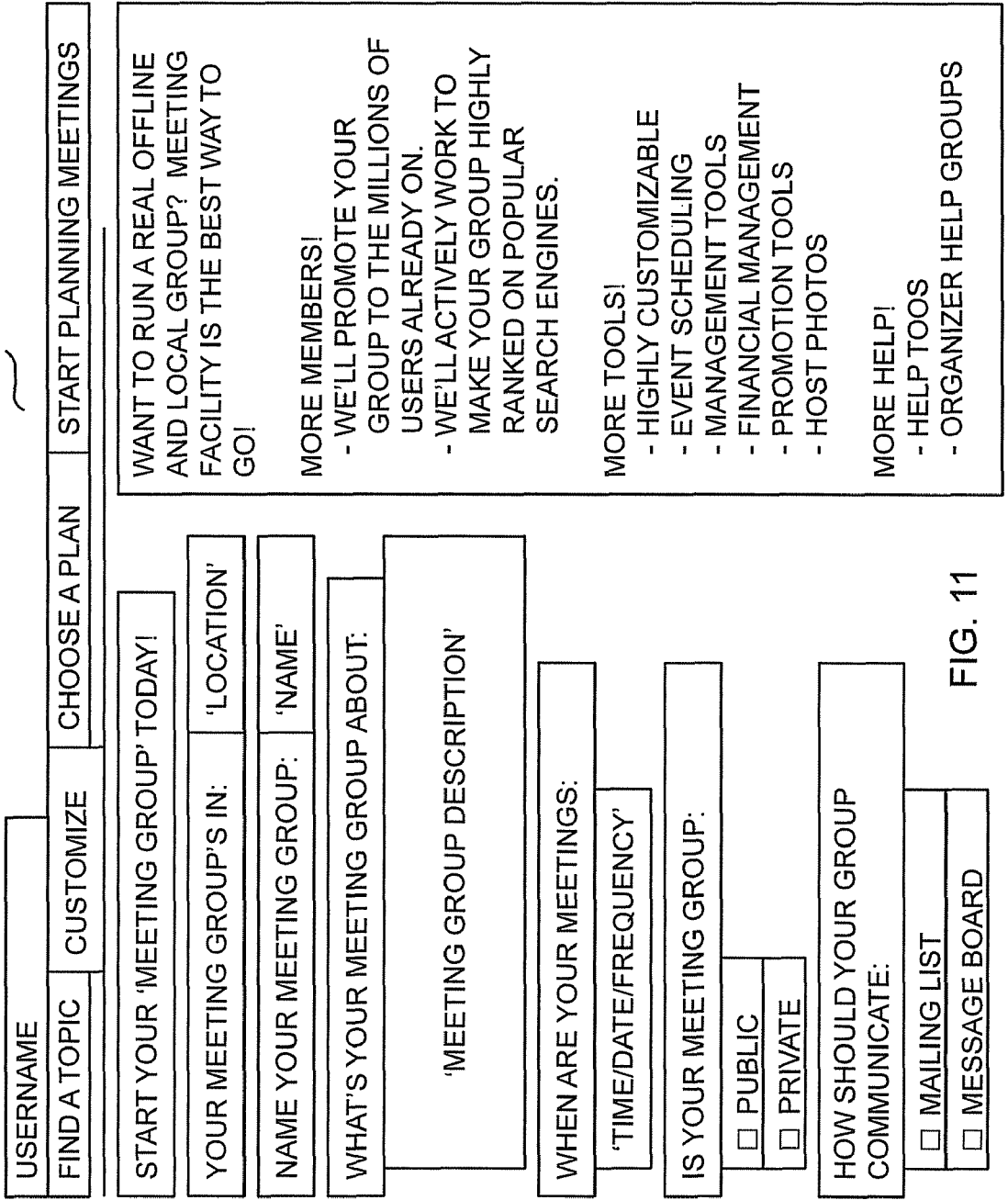
FIG. 11 depicts an embodiment of a start a meeting group tab with customization.

FIG. 11 depicts an embodiment of a start a meeting group page 1100, which may include a search interface or search facility for finding a topic that the individual will create the new meeting group in, and in which the meeting group may be customized. Customizing may include specifying the location of the group, name of the group, a photo of the organizer, a description of what the group is about, when meetings are, whether the group and/or meetings are private or public, communications options, RSVP options, scheduling options, enable/disable message board and/or mailing list, purchase options, coupon options for sponsorship programs or check payments, money back options, secure transactions options, payment options, and the like. In embodiments, after the meeting group has been created, a notification to those individuals who have signed up may be sent, such as within a period of time after creating the meeting group. FIG. 12 depicts an embodiment of a new organizer group home page 1200 with start planning meetings options, including congratulations text and organizer checklist banner, notification that meeting groups in the making list announcement and invitations will be sent within 72 hours, organizer help and tools, email the meeting group and the organizer's checklist, group pages such as 'welcome', 'about us', 'calendar (default page to plan a meeting), 'members', 'photos', 'messages', 'polls', 'files' and 'promote', organizer profile, 'schedule meeting' button to add meeting to the calendar, and the like. Features and functionality may include click through to organizer checklist options 'create a descriptive title', 'write an agenda' and 'pick a date and time', edit your meeting group options to edit title, date, enter a location, and customize general meeting details, add a photo, set RSVP options and 'schedule meeting' button, and the like.

In embodiments, the present invention may include an organizer account page, including information requested during account creation and subscription. The member may change the various information, such as their name, userID, email address, password, location, birthday, Skype name, and the like. The 'your subscription' section may allow an Organizer to change the subscription renewal option, see fall payment history, opt to start receiving payment receipts, change/update credit card information and cancel subscription (renewal). A contact billing support link may allow organizers to use a contact form through the site to contact meeting facility support. An organizer, co-organizer, assistant organizer, and the like, may step down from that position in a meeting group. As a member, an Organizer may also leave a meeting group, and edit their mailing list settings. In addition, there may be the option to subscribe/unsubscribe to meetings in the making lists or adjust settings, cancel message board subscriptions, adjust general email preferences (who can contact member), unsubscribe from the meeting service completely, and the like.

In embodiments, the present invention may include an organizer help and tools page, with subject tabs including news, settings, meetings and locations, communicate, grow, help, and the like. Various help facilities for helping an organizer set up the group may be provided, such as for the meeting name, meeting location, a description of the group, other topics that may suit the meeting group, when meetings are held, what are members called, writing a message to new members, adding a photo for the homepage, private vs. public settings, invitation settings, messaging settings such as for email and message board, update feeds, profile questions, new or leaving member emails, fee settings, Wiki sharing settings, manage the meetings button that may lead to a calendar page, create a new meeting button, manage the locations button, create a location button, communications broadcast settings, create and view polls, add profile questions, personalize the 'about' page, and the like. In addition, there may be an organizers' forum, which may link to a main discuss meetings forums, such as the organizer forum, an organizer center, which may link to how-to articles posted to the organizer resource center, a facility for 'finding an organizer meeting near you' that may link to an organizer topic homepage, map and search option, list of largest and newest Organizer Meetings, and the like. There may be provided a frequently asked questions (FAQ) section that may link to an organizer FAQ from the help section. There may also be a contact for linking directly to a home page. There may be help provided to an organizer to help grow the group, such as adding information into the group's blog or into social networking sites, create customized products, create a social network application, how to invite others to the group, create flyers and business cards, create logos, and the like.

In embodiments, the present invention may include an organizer email page for various communications options, including using the message board, using mailing lists, archived mailing lists, emailing an individual, using an email form, and the like. Using the email form may allow the organizer to click to 'see more options' and send messages to subsets of members; including mailing list members, all members, inactive members, members associated with specific meetings, and the like. The page may also allow the organizer to post messages to the message board, preview, provide correspondence through the site, and the like.

FIG. 13 depicts an embodiment of an organizer's checklist, such as to provide suggested tips an organizer may complete in order to run a more successful meeting group. Each option may summarize functionality or offer a tip. Tips may have links to settings, functions, organizer center articles for more details, and the like. In addition, the organizer checklist may be disabled from the settings tab.

In embodiments, the present invention may include various meeting group resource pages, including the member home, meeting group home, about us, calendar, photos, group settings, organizer resources, promote, find a meeting group, city calendar, and the like. FIG. 14 depicts a member home page 1400 that may be what the member sees when they login, and may allow the member to list all upcoming meetings for the member, such as sorted by date, and the like. The meeting group home may provide pages about a specific group, and may include a feeds for what is new to the group, a main header for the group, mailing lists, message boards, schedules, and the like. The about us page may provide the group's own wiki or mini-web site. Both the organizer and the members (with the organizer's permissions) may create as many pages as they like. The meeting group's calendar page 1500, as depicted in FIG. 15, may provide a place to post notes associated with group activities and meetings. The photo page may be provide to each group, and may be organized as albums around activities and meetings, where photos may provide links to further information. The group setting page may be a central place for all settings that may be used in the management of the group. The organizer resources page 1600, as depicted in FIG. 16, may be a central place for all organizer resources, including an organizer's checklist, organizer resource center, organizer message board, promote your meeting group, frequently asked questions, contact meeting group support, find an organizer meeting group near you, payments you've collected, and the like. The promote page may provide a centralized page for all resources associated with the promotion and growth of the group. The 'find a meeting' page may be the central location provided to search for groups within the meeting facility. In addition, the city calendar 1700, as depicted in FIG. 17, may provide for a city, regional, area, summary of all the meetings occurring for a given area FIG. 18 depicts an embodiment of a portion of a 'creating an event' page 1800, where organizers have the option to charge members and how to implement payments, such as choosing the payments option (e.g. Amazon Payments, PayPal). For instance, the organizer may calculate how much to charge based on what they want their members to pay OR what they want to pocket (user can edit either the "Attendees pay"... or the "You will receive"). There may be an option to require payment to be linked to an RSVP, such as checking a box to indicate that members must pay via Payments when they RSVP, or not checking indicating members can RSVP, and pay however they want (e.g. via Amazon, with cash, etc). Using Payments may also mean the organizer may have to enter a refund policy that members read and accept when they RSVP. In embodiments, there may be an RSVP response page, FIG. 19 depicts an embodiment of a printable ticket 1900, which may include the name of the event, date and time of the event, fees, a map showing the location of the event, a unique bar code for the event, and the like.

FIG. 20 depicts an embodiment of a payments received page 2000, which may provide a list of all the events an organizer has set up for which they're charging their members, such as by using Amazon Payments or PayPal. Details of each event may be viewed, including refund management, printing of tickets, communication with members, and the like. Event details may also be viewed, where the organizer may see the payment status of each of their members.

In embodiments, the present invention may include other options introduced into the event creation process, including the ability for organizers to set an RSVP deadline for their members (i.e. the event is on Friday but the organizer needs to know by Wednesday how many people are definitely coming). In addition, organizers may ask their members questions when members RSVP (e.g. email info, emergency contact, and the like).

Figure 21:
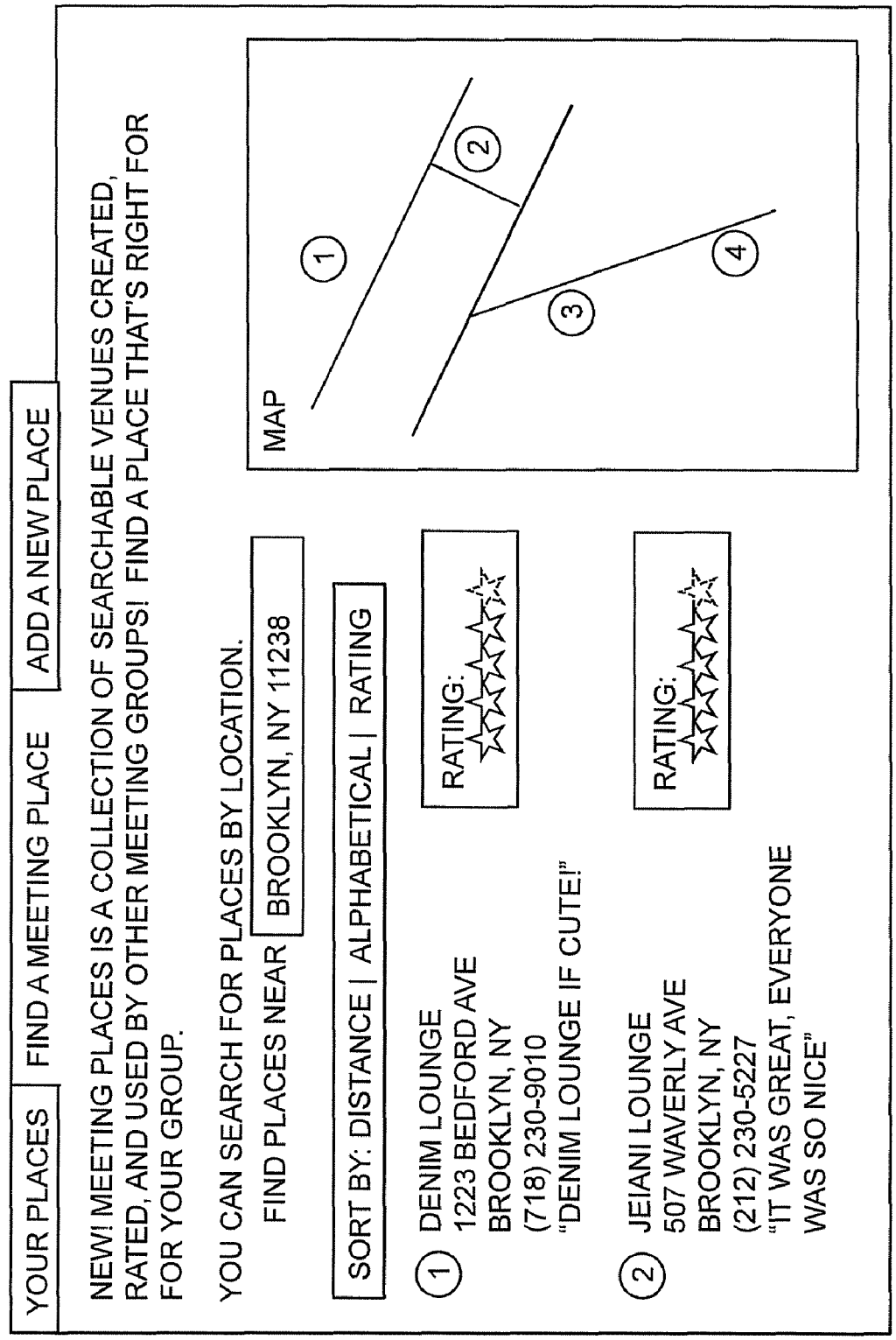
FIG. 21 depicts an embodiment of a find a meeting place page.

FIGS. 21 and 22 depict embodiments for how an organizer may choose the venue (i.e. the location or place) for a meeting of the group, including pages for 'your places' for venues the organizer has used before, find a meeting place 2100 for locating a new place to meet, venue details 2200, editing venue details, adding a new place, posting an event/venue survey, and the like. The organizer may save information detailing venues that the group has used before, and may choose to share this information with other groups, which may also include a review of the venue. The organizer may search for a new venue, as from venues that have been shared by other organizers. Searches may sorted based on location, address, being near a point of interest, and the like. The search may provide a map detailing all venues within an area of interest. The organizer may be able to view venue details, including reviews, ratings, directions, a description of the setting, schedule of other meetings at the venue, revision history, changes to the venue, whether the venue public or private, loud, kid friendly, and the like. In embodiments, the organizer may be able to sort reviews based on the user type, location, member, and the like. The organizer may also be able to add a new venue, such as by adding information and their experience with the group at the site. A group may provide a post event survey that includes a review of the venue.

In embodiments, the present invention may include a member titles page. Organizers and assistant organizers may give their members "titles.", such as for organizers assigning roles to their members (e.g. venue scout, chief cookie bringer, etc.). However, the organizer may also use member titles for other purposes, such as for humorous reasons, tracking attendance, for an event experience, money owed, and the like. These member titles may be added, edited, deleted, made public, kept private, and the like, and may show up whenever the member is referenced or displayed in association with the meeting group.

In embodiments, the present invention may include an organizer's checklist, where the meeting facility helps new organizers get their groups off the ground, such as identifying techniques that could help them succeed, and pushed them to the organizers as "tips." These tips may be checked off when completed, and show as checked off on all associated pages. As tips are checked off there may be a completion indicator updated, such as a sliding banner bar, a percent complete, and the like. FAQ articles may also be linked to tips and advice.

In embodiments, the present invention may include a pre/post event discussion page, where members may post comment about the event, including posting comments from the post event survey, comments in a chat box, and the like. Comments may be edited or deleted by the organizer.

In embodiments, the present invention may include an attendance taking widget. After an event occurs, an organizer may edit attendance to accurately determine who attended and who was absent. The organizer may change the RSVP of a person after the event occurs. For instance, if someone RSVP'd "Yes" but did not attend, the organizer may click the "Mark as absent" button and they are moved to the absent side. Or, if the person is marked absent but actually attended, the organizer may edit the entry.

In embodiments, the present invention may include facilities for meetings in the making, the process by which an individual may express their desire to be a part of a group that doesn't yet exist within the geographic region that the individual has access to. In an example of a local topic page, one of these pages may exist for each intersection of a topic and a locale. In embodiments, individuals may come to these pages after doing on-line searches, such as a Google search. For example, if an individual searched "Taoism group New York", they might end up on a site. If there are no meeting groups in the topic/location that an individual is looking for, or if they don't want to join the available groups for some reason, they may sign up to be notified if new Meeting Groups start. Listed below any meeting groups (if any), may be a list of people who have signed up for through this process of "Meetings in the Making", which may display each person's name, a short intro they write, their photo, location, date, and the like. And for example, if someone were to start a new Taoism Meeting Group near New York, each of these people would receive an email inviting them to join. Upon signing up, an individual may introduce themselves and add a photo, choose other related topics, change location-radius, opt-in to a weekly update, and the like. Upon first signing up, the individual may receive a welcome email. The email may recommend other meeting groups related to the topics they've signed up for. From then on, whenever anyone starts a new meeting group in the topics you've chosen, the individual may be invited to join with a "New Meeting Group" email.

The "New Meeting Group" email may be generated by the meeting facility a few days after someone starts a new meeting group. An organizer may use this time period to get their group ready for its announcement. Members of meetings in the making may also opt-in to a weekly update email. This may repeat any new meeting groups that formed that week. It also may show a sample of one person from each topic list an individual has signed up to hear about, with a count of how many people are on each list. The weekly update email may also include some recommended meeting groups and a short version of the weekly calendar of meetings near the individual. This way, individuals with no new meeting groups in one week may see a mixture of other new content.

In addition, upon signing up for meetings in the making, the individual may also make a pledge. These may be promises to help out in some way if a new meeting group starts. An individual may check off as many pledges as they like, or write in their own. Seeing that other people have offered their help encourages potential organizers to step up and start a new meeting group. In embodiments, if an individual may be reminded of their pledge when they hear about new meeting groups via the new meeting group email. If an individual joins a meeting group, that group's organizer may be notified that you pledged, and prompted to follow up with you about it. In addition, an individual's pledges may show up on their profile, but may be only visible to themselves and their meeting groups' organizers. In embodiments, organizers may be encouraged to return to local topic pages from time to time, such as to recruit new members to their meeting group. They may be especially encouraged to recruit people who have pledged, since this is a sign that these people are very interested and are more likely to be active members. If an organizer is logged in, they may use envelope icons that may be next to each name to send that person an email invitation to their meeting group.

In embodiments, the present invention may include a greetings page, also referred to as a shout. Greetings may be messages posted on the site, sent from a single Meeting member to another. Individuals may be prompted to post greetings in several places on the site, and may be most centrally on each person's profile. The individual may write a greeting on the overview profile page or the greetings tab page. The overview page may have a truncated list the individual's greetings, where the greetings tab page may list them all, and may be sorted based on date, meeting group, a friends listing, and the like.

In embodiments, the present invention may include a mailing list page, which may be a distribution list that allows everyone in the group to email everyone else. Organizers may control whether the group gets a mailing list. Members may be able to control how often they receive messages, where they may email by using a unique email address, or from a form on the site. In addition, the user may have the option to automatically post all mailing list emails to the message boards.

In embodiments, the present invention may include how the meeting facility may be associated with a social network site, such as Facebook, MySpace, Bebo, Hi5, Orkut, and the like. Social network sites may be accessed through the meeting facility, such as through a meeting group promote page, which may link the member directly to the social network page. The member may sign-in to add to add a meeting group to a social network profile, link to the search tool for finding meeting groups, link to register with the meeting facility, block meeting group links, and the like. In embodiments, the individual may search for meeting groups without adding the social network application to their profile. From the social network an individual may display a meeting group's welcome message, link to join a meeting group, link to a group's page, link to a start a meeting page, link to a search for meetings, and the like. After a user agrees to add the social network, the application may appear on the user's profile page, such as displaying meeting groups the user organizes or is a member of, event name links to an event page, list all meeting groups that member is part of, link to refresh the list of meeting groups, link to edit the list of meeting groups, and the like. In embodiments, there may be a group information page, which may include the group's welcome message, a next event listing, a listing of members also available in the social network site, a link to view user's list of meeting groups, a link to a view a list of meeting groups that friends are in, a link to find meeting groups, a link to the site associated with the meeting facility, and the like. A member may be linked to RSVP functionality in association with the social networking site, such as displaying an event description, options for RSVP, displaying photo and links to list of meeting groups, display RSVP responses, link back to group page, and the like. In embodiments, there may be a way to view all the meeting groups that friends are a part of, including their names and photo, the group names, and the like. In embodiments, this may be available to those friends who also have the meeting facility application installed, and for those who do not, they may be invited to add the meeting facility application.

In embodiments, the present invention may include how the meeting facility may associate groups together into an alliance, where an alliance may be a self-organized coalition of groups working together for a common purpose, a group of groups, and the like. In embodiments the alliance may be open to any group with a web presence, including groups on other platforms such as other social network sites, Facebook, MySpace, Yahoo, Google, and the like, where the alliance may help groups share knowledge and resources amongst each other. In embodiments, anyone may be able to start an alliance, and anyone group may join an alliance (which may be subject to approval by the alliance organizer). A user may register a member account with an alliance site (or use an existing account). Alliances created with a new member account may not be activated until the account email address is verified (by means of a confirmation email). Next, an Alliance may customize a "short name" (based on the full name by default), that may be used in the Alliance's web site URL and as the address of the Alliance's email mailing list. Alliances may then be categorized by free form keywords or tags by which the organizer identifies the Alliance's areas of interest or activity. Once complete, the alliance organizer may be shown a success message and directed to the new Alliance's home page.

In embodiments, the present invention may include an alliance home page, which may include a customizable header, description of the alliance purpose, logo, navigation links to available alliance content (e.g., settings, discussions, resources, and the like), organizer tools (e.g., links to contextually available actions, such as to invite groups to join, view pending groups who have requested to join, add new gadgets to the home page, enter a text message to display, and the like. In embodiments, gadgets may allow a customized selection of what types of tools and content are displayed on the page, along with placement and size, and the like. Features and functions associated with the home page may include a listing of groups associated with the alliance, view of the latest actions occurring within the member groups, links to communications tool, links to discussions, links to wiki-style collaborative pages, and the like.

In embodiments, the present invention may include how groups may be invited to join an alliance, where an alliance organizer and group contact members may invite other groups to join the alliance, such as by email, clicking on an invite link on the home page, and the like. Upon receiving an invitation, recipients may receive a customized message with a link back to the join page for the alliance. When invited by the alliance organizer, groups joining through the invitation link may be automatically "approved" and included in the Alliance. In embodiments, for invitations sent by alliance members, groups joining through the invitation link may be subject to approval by the alliance organizer.

In embodiments, the present invention may include how groups may join an alliance. When joining an alliance, the group contact may be prompted to enter the group's information, including name, location, website URL, description, and the like. Existing members may select a previously entered group or create a new one. Requests to join an Alliance may be subject to approval by the alliance organizer. Depending on context, the group's membership may be left in various states, such as if the group joined in response to an invitation by the alliance organizer the group may be automatically approved and active in the alliance, if the request is from an existing or verified member the request may be pending and is submitted to the Alliance Organizer for approval, if the user created a new member account during the join request the group may be left in a not verified state and only moved to pending when the member's email address is verified, and the like. In embodiments, when a group's request to join an Alliance enters a pending state, notification messages may be sent, such as a confirmation to the applying group contact detailing the join request and the alliance information, a pending group notification to the alliance organizer containing the group details (e.g., member information, group name, URL, description, reason to join, and the like) and a link to enable immediate approval or denial of the join request, and the like. In addition, the alliance organizer may see a prompt in the organizer tools selection of the of the alliance home page when there are pending join requests. In addition, the alliance organizer may be able to remove any previously approved group from the Alliance via a link in the group listing.

In embodiments, the present invention may include how a home page may be customized, such as the layout and content displayed on the alliance home page being modified by the alliance organizer to suit the alliance's needs. In embodiments, content may be bundled into gadgets, such as based on the Google Gadgets, Google OpenSocial specification, and the like. Gadgets may provide a modular form for information and functionality to be included on the page. In embodiments, the alliance site may implement an OpenSocial gadget container, which will ultimately allow standard compliant $3^{rd}$ party applications to be included in the site. Gadgets may be moved to a new location on the page, removed from the page, have individual settings customized, added to the page from a list of available options, and the like. For instance, the alliance organizer may select from an expandable list of available gadgets to add to the page, where added gadgets may appear immediately on the page below. Individual gadgets may be able to declare whether or not more than one instance is allowed per Alliance. Gadgets may be moved by clicking on the title bar and dragging the gadget to the new location. As the gadget is moved, the page layout may automatically adjust to show the new droppable location for the gadget. The alliance organizer may be able to remove any gadget instance from the page by clicking on the appropriate icon. In embodiments, a gadget that has been removed may be re-added if desired. Gadgets may define a list of editable settings. For example, a feed reader gadget may include a setting for the feed URL to display and the number of feed entries to be shown. In addition, any gadget may be embedded on any other HTML page by copying and pasting a short snippet of HTML code.

In embodiments, the present invention may include how groups may be displayed, where a list of groups in an Alliance may be displayed through a groups gadget. Groups may be searched by location to find the nearest group, such as sorted by distance from the entered location. Each group may also have a detail view available with additional group information, such as including a group description, a history of group information that has been automatically updated by the alliance system, and the like. For supported group platform sites, the alliance system may be periodically updated with information for all of the member groups, such as the number of members in the group, the date of the group's next event, other platform specific information, and the like. The group detail view may show the most recently applied updates. In embodiments, history may only be visible to the group contact and the Alliance Organizer.

In embodiments, the present invention may include alliance discussion, which may provide a combined online message forum and mailing list for each Alliance. Members of the Alliance may be able to post messages online through the site, send an email message to the Alliance mailing list, and the like. Members may opt to receive all messages by email, to receive only responses within a given thread by email, to view all messages on the web site, and the like. Individual threads of discussion may be flagged as private (e.g., only visible to members of the Alliance), as public (e.g., viewable by everyone), and the like. In addition, messages posted since a member last viewed the discussion may be flagged as new and highlighted on the next visit.

In embodiments, the present invention may include a discussion thread, where replies to a new discussion message may be collected into a single conversation thread. In addition, messages in a conversion thread may be displayed in context, such as below the message that was replied to, ordered chronologically within other replies to the same parent message, and the like. When a member re-visits a previously viewed thread, the previously viewed messages may be automatically collapsed, while any new messages may be expanded, such as for easy highlighting. The alliance organizer may change the visibility setting (e.g., public, private) for any discussion thread, delete the discussion thread, edit the text of any individual message, and the like.

In embodiments, the present invention may include alliance resources, where each alliance may have the ability to create and publish wiki-style web resource pages as part of their Alliance site. These pages may be collaboratively created and edited by all members of the Alliance, though the Alliance Organizer may have final approval on what pages and changes are publicly visible outside of the Alliance members. Like alliance discussions, each resource page may be flagged as public (e.g., viewable by all site visitors) or private (e.g., only visible to Alliance members). Each set of changes to an individual page may be stored as a separate revision of the page content. The Alliance Organizer may select the specific revision of a page that may be made public. Members may edit pages that have been publicly published, but their revisions may be pending to the page (not visible) until approved by the Alliance Organizer. Public pages may appear for all site visitors, while private pages may only appear for logged in alliance members. When a new alliance is created, it may be populated with a set of resource page templates for commonly provided information. In embodiments, the alliance organizer may have the option of deleting any pages that are not relevant. Each resource page may be accessible via a unique URL based on the page name. This may make it easy to link to the page from other web sites. The page URLs may be subject to the public/private constraint set for the page. In addition, access to a private page URL by a non-Alliance member may result in a "not authorized" error message, with a prompt to login to continue.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

The invention claimed is:

1. A computer program product embodied in a computer readable medium that, when executing on one or more computers, helps organize an in-person gathering of users of topic-related interest by performing the steps of:
   providing meeting management resources through a meeting facility, wherein the meeting management resources enable a meeting group organizer to manage a meeting group, and wherein the meeting management resources enable a meeting group organizer to provide voting options for users to vote on at least one of the following: meeting venue, meeting agenda, meeting activity, meeting time, meeting date, or any combination thereof;
   receiving meeting group criteria from a user;
   providing to the user an indication of at least one meeting group of a plurality of meeting groups based on the user's received meeting group criteria, wherein the meeting groups have respective members;
   receiving from the user a selection of a meeting group to join; and
   enabling the organizer to accept the user as a new member to the meeting group and to manage meeting group user resources available to the user through a web-based graphical interface provided by the meeting facility.

2. The computer program product of claim 1, wherein the received meeting group criteria is input through a search interface.

3. The computer program product of claim 2, wherein the search interface is provided through the meeting facility.

4. The computer program product of claim 2, wherein the search interface is provided through a third-party.

5. The computer program product of claim 2, wherein the search interface is a search engine.

6. The computer program product of claim 1, wherein the received meeting group criteria is input through browsing.

7. The computer program product of claim 1, wherein the meeting group criteria includes a geographic locale of the user.

8. The computer program product of claim 7, wherein the geographic locale is provided by a zip code input by the user.

9. The computer program product of claim 7, wherein the geographic criteria is determined through a computing facility being utilized by the user.

10. The computer program product of claim 9, wherein the computing facility is a mobile computing device.

11. The computer program product of claim 9, wherein the computing facility is service provider computer facility.

12. The computer program product of claim 1, wherein the meeting group criteria includes at least one of a plurality of topics.

13. The computer program product of claim 12, wherein the topic is input by the user.

14. The computer program product of claim 12, wherein the topic is selected by the user from a predetermined list of topics.

15. The computer program product of claim 12, wherein the topic is selected by the user from a list provided by a search interface.

16. The computer program product of claim 1, wherein at least one of the meeting management resources is a calendar of meetings.

17. The computer program product of claim 16, wherein the calendar of meetings specifies a location for a meeting.

18. The computer program product of claim 16, wherein the calendar of meetings specifies a date and time for a meeting.

19. The computer program product of claim 16, wherein the user may select to join one of a plurality of meetings included in the calendar of meetings.

20. The computer program product of claim 19, wherein the selection to join is through an RSVP facility.

21. The computer program product of claim 1, wherein at least one of the meeting management resources is access to at least one of the respective members of the meeting group the user joined.

22. The computer program product of claim 21, wherein access is through email.

23. The computer program product of claim 21, wherein access is through instant messaging.

24. The computer program product of claim 21, wherein access is to the organizer.

25. The computer program product of claim 1, wherein the organizer is able to share access to meeting management resources with select members of the meeting group.

26. The computer program product of claim 1, wherein a meeting group is a chapter.

27. The computer program product of claim 1, wherein voting options are provided to a user through a mobile computing device.

28. The computer program product of claim 1, wherein the meeting group organizer provides a member of the meeting group with access to the meeting management resources to provide users with the voting options.

29. A computer program product embodied in a computer readable medium that, when executing on one or more computers, helps organize an in-person gathering of users of topic-related interest by performing the steps of:
providing a web-based meeting facility to a plurality of users, wherein each of the plurality of users choose to join at least one of a plurality of meeting groups based on topic-related interest and geographic locale;
enabling at least one user-organizer to maintain control of organizing meetings with the at least one of the plurality of meeting groups, wherein the at least one of the plurality of meeting groups is made up of a subset of the plurality of users; and
providing organizational facilities to the user-organizer through the web-based meeting facility for creating and facilitating activities of the at least one of the plurality of meeting groups, wherein one of the organizational facilities is scheduling meetings, and wherein the organizational facilities enable the user-organizer to provide voting options for users to vote on at least one of the following: meeting venue, meeting agenda, meeting activity, meeting time, meeting date, or any combination thereof.

* * * * *

UNITED STATES PATENT AND TRADEMARK OFFICE
CERTIFICATE OF CORRECTION

| | |
|---|---|
| PATENT NO. | : 8,359,206 B2 |
| APPLICATION NO. | : 12/482084 |
| DATED | : January 22, 2013 |
| INVENTOR(S) | : Gregory P. Whalin et al. |

It is certified that error appears in the above-identified patent and that said Letters Patent is hereby corrected as shown below:

Face of the Patent, Column 1, Item (54), Line 1, and at Column 1, Line 1, delete "WEB BASED" and insert -- WEB-BASED --

Face of the Patent, Column 1, Item (60), insert -- Provisional application No. 60/478,345, filed on Jun. 16, 2003. --

Signed and Sealed this
Second Day of April, 2013

Teresa Stanek Rea
*Acting Director of the United States Patent and Trademark Office*